(12) United States Patent
Kobayashi et al.

(10) Patent No.: US 11,536,637 B2
(45) Date of Patent: Dec. 27, 2022

(54) ABRASION TEST APPARATUS

(71) Applicant: HITACHI METALS, LTD., Tokyo (JP)

(72) Inventors: Yoshihiko Kobayashi, Tokyo (JP); Shuho Koseki, Tokyo (JP); Tadashi Furuya, Tokyo (JP); Katsuhiro Obata, Tokyo (JP); Fumiaki Honda, Tokyo (JP); Takahiro Makiyama, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 1015 days.

(21) Appl. No.: 16/319,132

(22) PCT Filed: Jul. 19, 2017

(86) PCT No.: PCT/JP2017/026061
§ 371 (c)(1),
(2) Date: Jan. 18, 2019

(87) PCT Pub. No.: WO2018/016517
PCT Pub. Date: Jan. 25, 2018

(65) Prior Publication Data
US 2021/0372899 A1    Dec. 2, 2021

(30) Foreign Application Priority Data

Jul. 21, 2016  (JP) ............................. JP2016-143229

(51) Int. Cl.
| | | |
|---|---|---|
| *G01N 3/56* | (2006.01) |
| *G01N 3/02* | (2006.01) |
| *B21D 22/00* | (2006.01) |
| *B21J 5/00* | (2006.01) |
| *B21D 22/20* | (2006.01) |

(52) U.S. Cl.
CPC ............... *G01N 3/565* (2013.01); *G01N 3/02* (2013.01); *B21D 22/00* (2013.01); *B21D 22/20* (2013.01); *B21J 5/00* (2013.01); *G01N 3/56* (2013.01)

(58) Field of Classification Search
CPC . G01N 3/565; G01N 3/02; G01N 3/56; B21D 22/00; B21D 22/20; B21J 5/00
See application file for complete search history.

(56) References Cited

U.S. PATENT DOCUMENTS

| 4,939,922 A | 7/1990 | Smalley et al. |
|---|---|---|
| 2005/0120774 A1 | 6/2005 | Shinohara et al. |

(Continued)

FOREIGN PATENT DOCUMENTS

| CN | 1890549 A | 1/2007 |
|---|---|---|
| CN | 102116722 A | 7/2011 |

(Continued)

OTHER PUBLICATIONS

International Search Report dated Oct. 10, 2017 for International Application No. PCT/JP20174/026061.

(Continued)

*Primary Examiner* — Jonathan M Dunlap
(74) *Attorney, Agent, or Firm* — Volpe Koenig

(57) ABSTRACT

Provided is an abrasion test apparatus for measuring an abrasion state of a workpiece, including: a workpiece holding mechanism holding the workpiece; a contact tool repeatedly making contact and non-contact with the workpiece; a rotating mechanism holding the contact tool to be freely rotatable; and a heating mechanism intermittently heating an end portion of the contact tool.

12 Claims, 14 Drawing Sheets

(56) References Cited

U.S. PATENT DOCUMENTS

2017/0284914 A1* 10/2017 Johnson ................ G01M 99/00
2019/0310175 A1* 10/2019 Hou ........................ G01N 3/56

FOREIGN PATENT DOCUMENTS

| | | |
|---|---|---|
| DE | 3325661 A1 | 1/1985 |
| JP | 57-206847 A | 12/1982 |
| JP | 64-025034 A | 1/1989 |
| JP | 07-113735 A | 5/1995 |
| JP | 10-260124 A | 9/1998 |
| JP | 2007-513354 A | 5/2007 |
| JP | 2009-000694 A | 1/2009 |
| JP | 2011-158448 A | 8/2011 |
| JP | 2012-108077 A | 6/2012 |
| JP | 2014-223653 A | 12/2014 |
| KR | 2003-0052902 A | 6/2003 |
| SU | 560166 A1 | 5/1977 |
| WO | 2005/057181 A1 | 6/2005 |

OTHER PUBLICATIONS

Partial Supplementary European Search Report dated Feb. 20, 2020 for the European Patent Application No. 17831033.0.
Extended European Search Report dated Jun. 24, 2020 for European Patent Application No. 17831033.0.
Chinese Office Action dated Oct. 10, 2020 for Chinese Patent Application No. 201780044560.9.

* cited by examiner

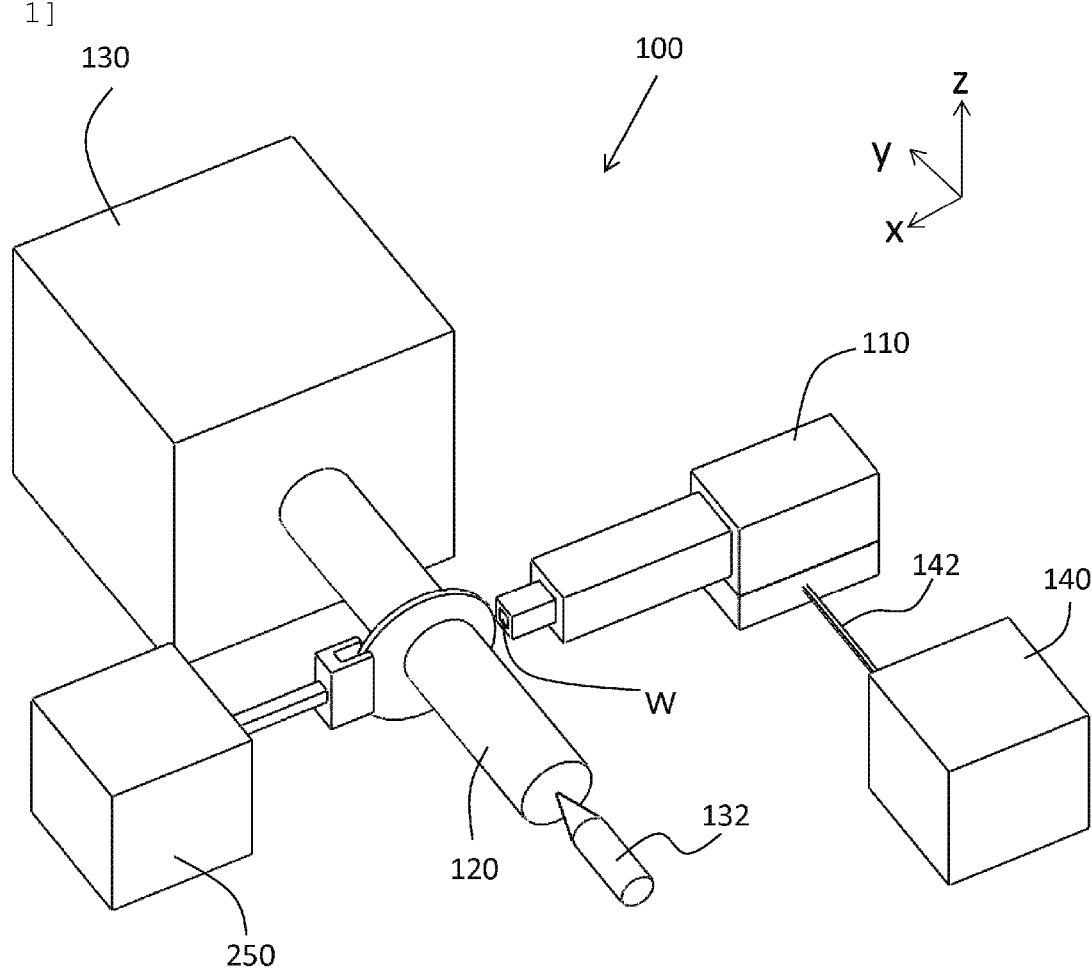
[FIG. 1]

[FIG. 2]
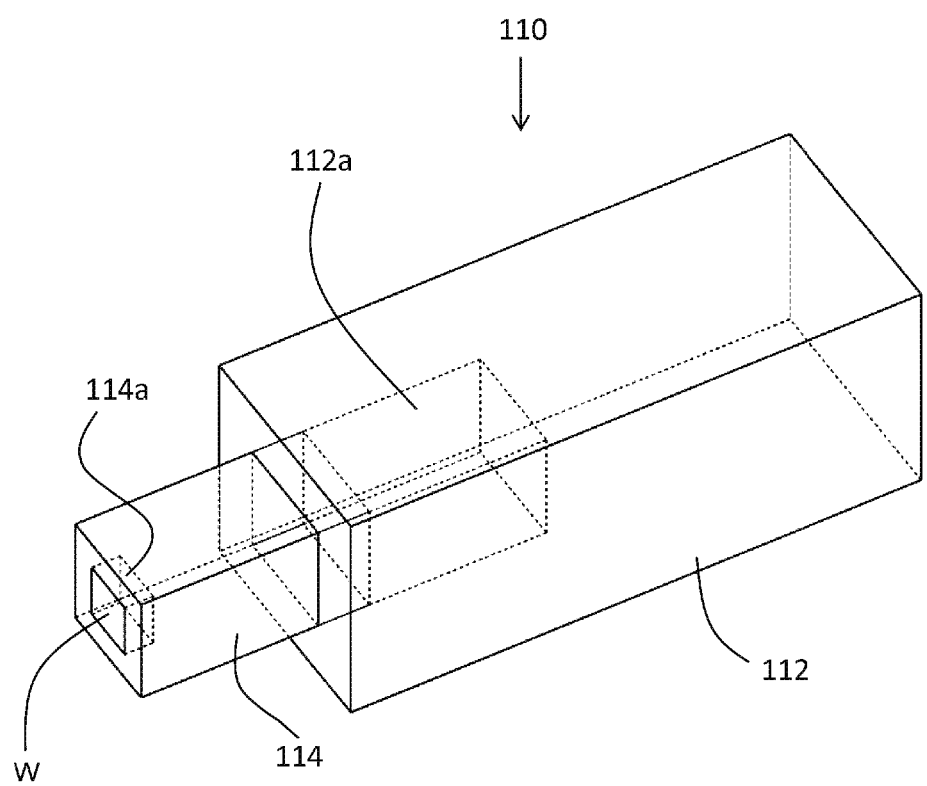

[FIG. 3A]
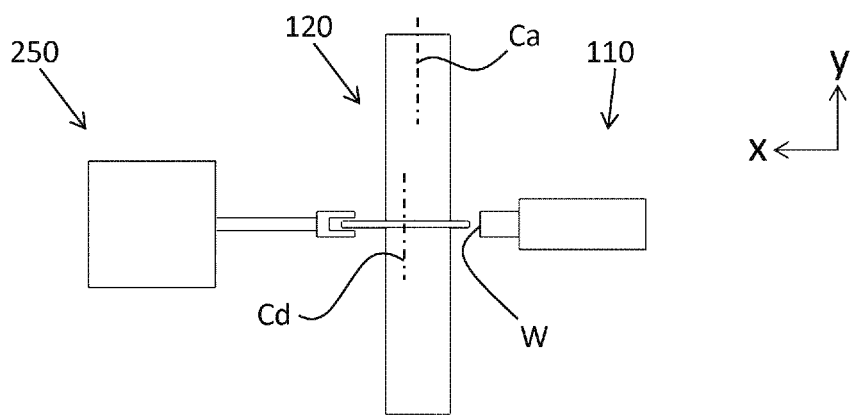
[FIG. 3B]
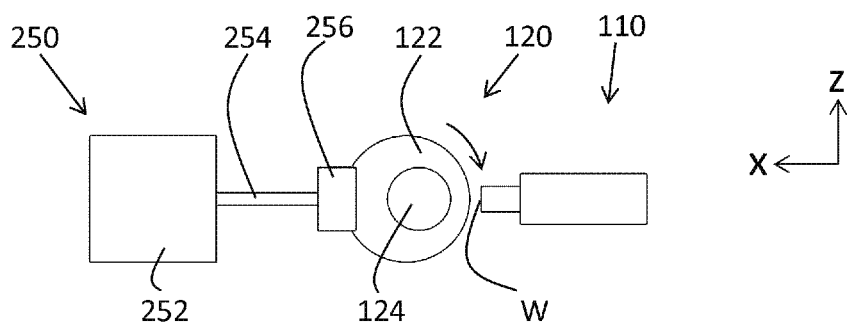
[FIG. 3C]
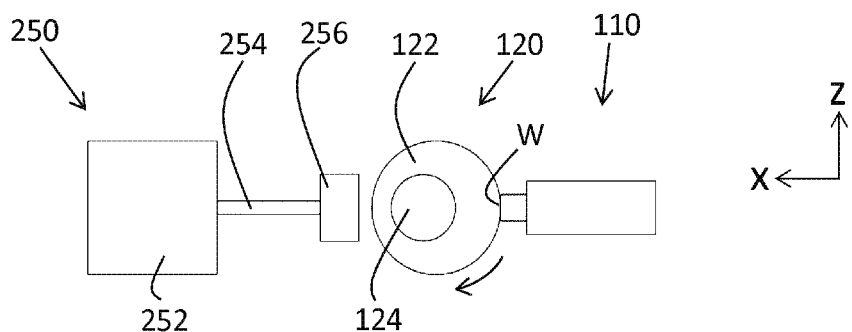

[FIG. 4A]
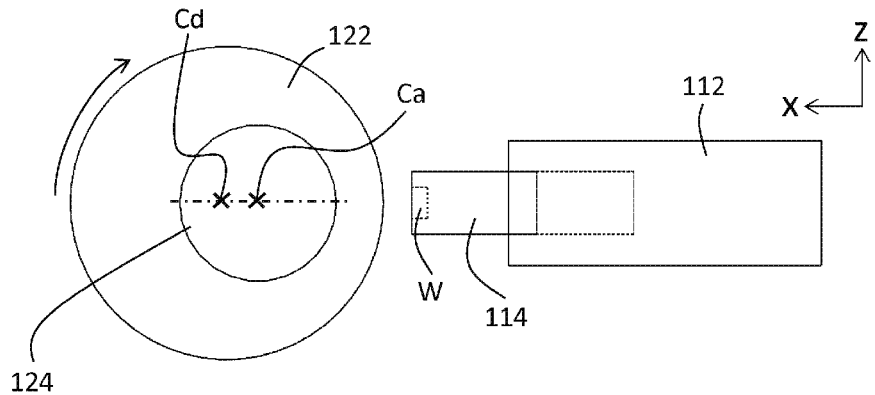
[FIG. 4B]
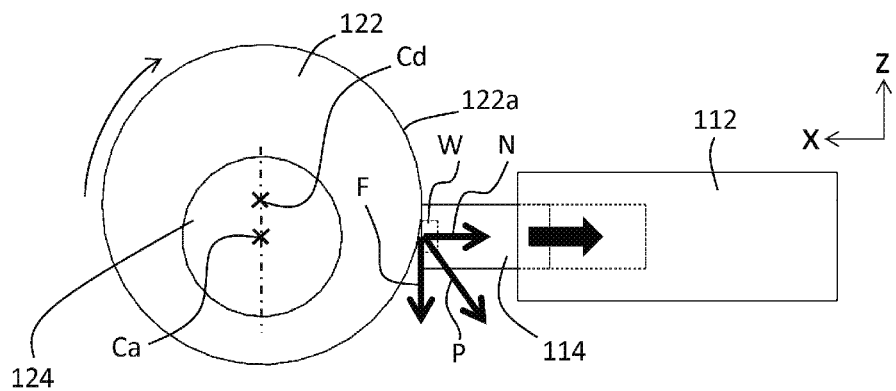
[FIG. 4C]
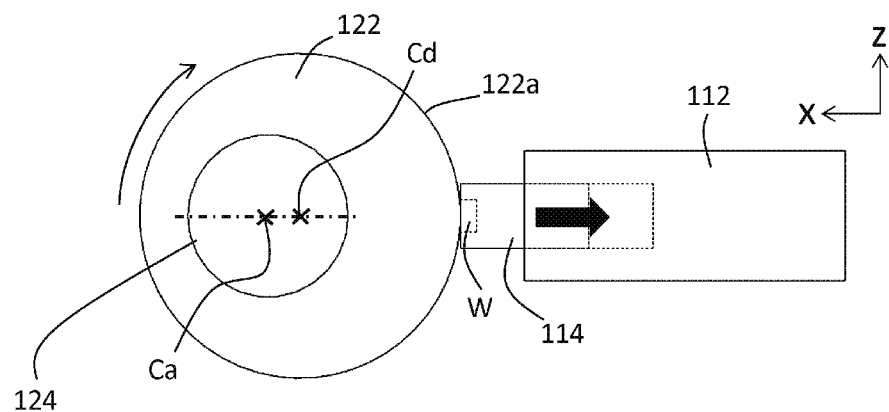
[FIG. 4D]
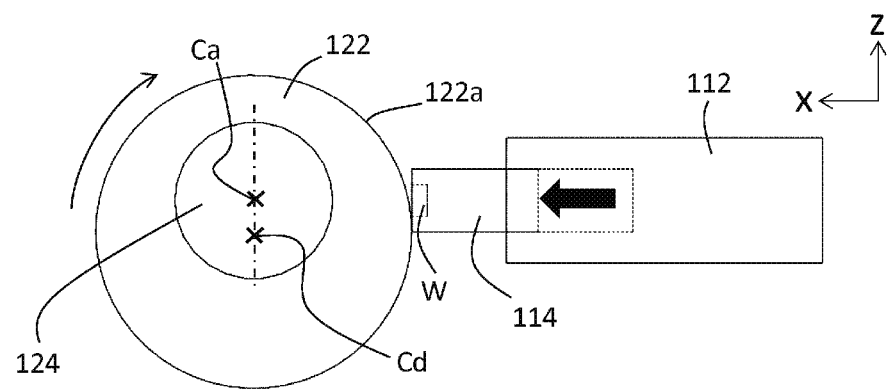

[FIG. 5A]
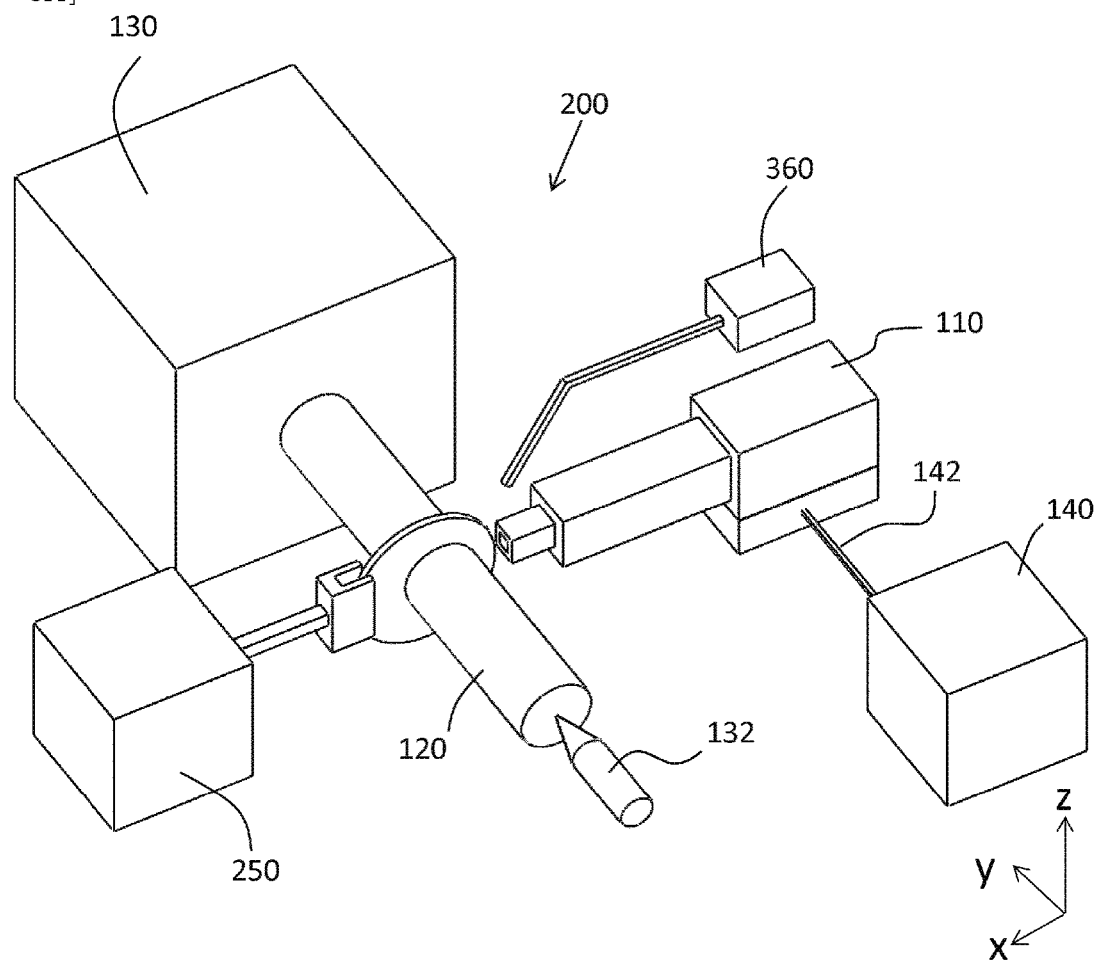
[FIG. 5B]
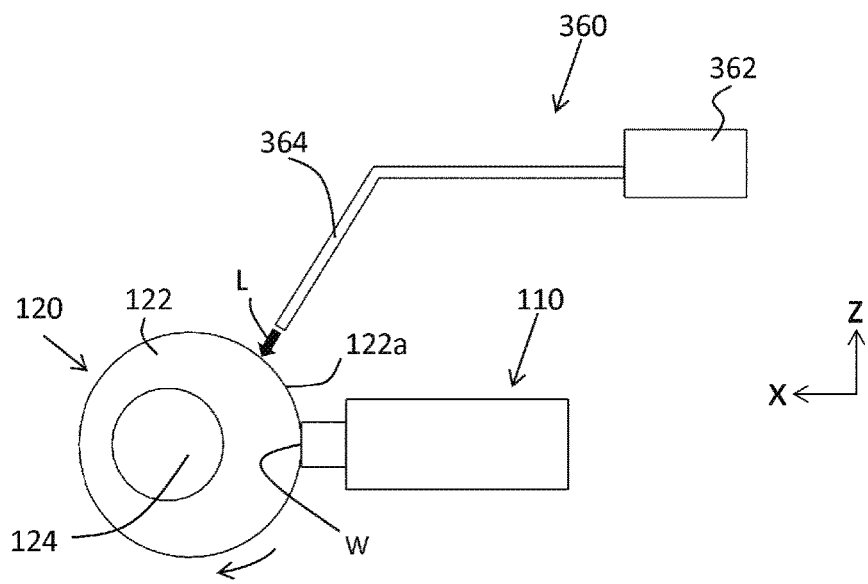

[FIG. 6]
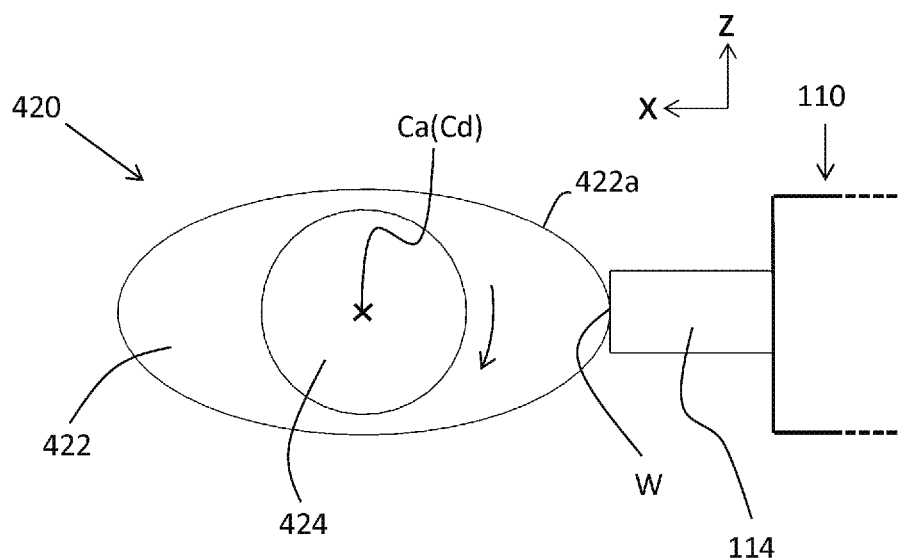
[FIG. 7]
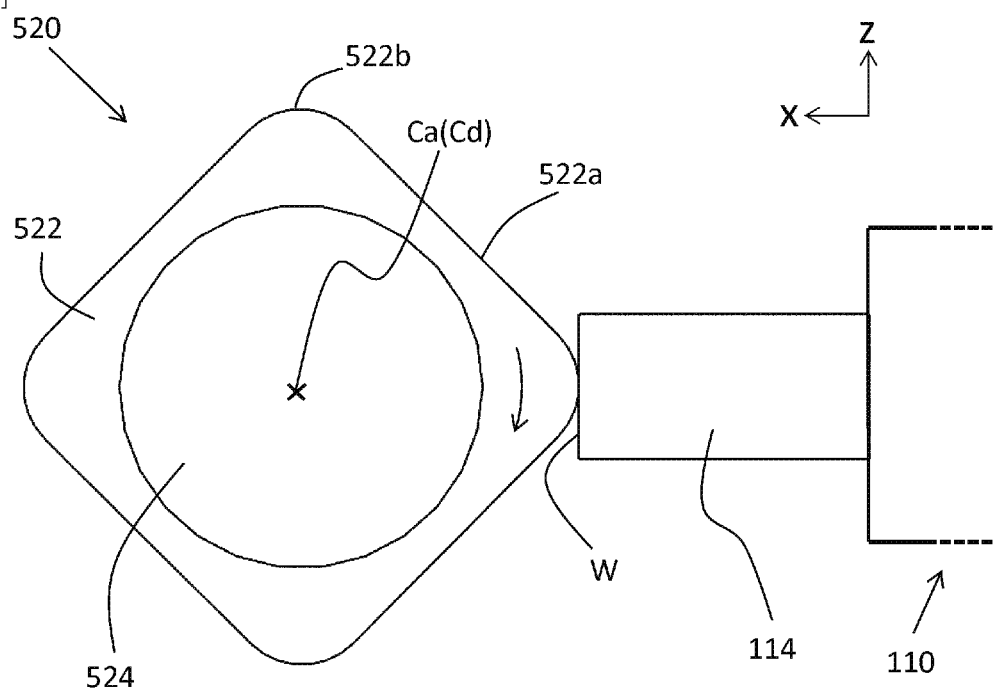

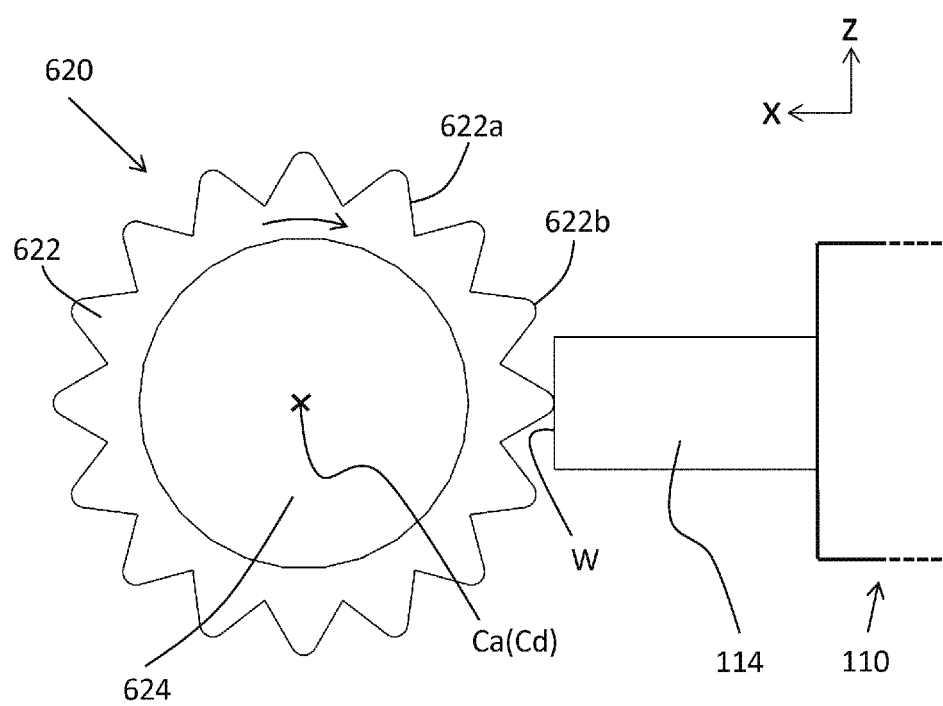
[FIG. 8]

[FIG. 9A]
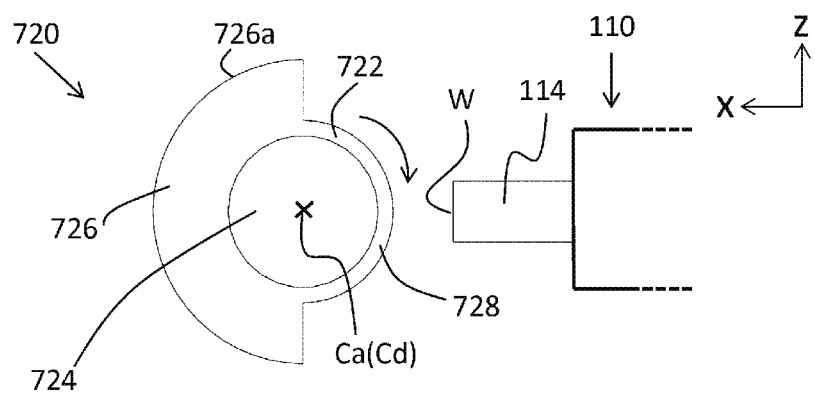
[FIG. 9B]
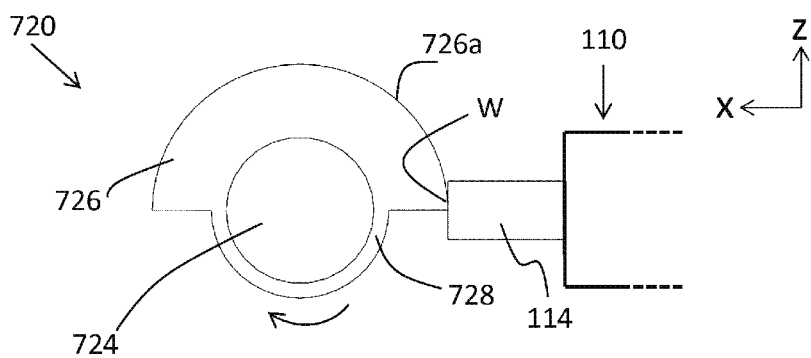
[FIG. 9C]
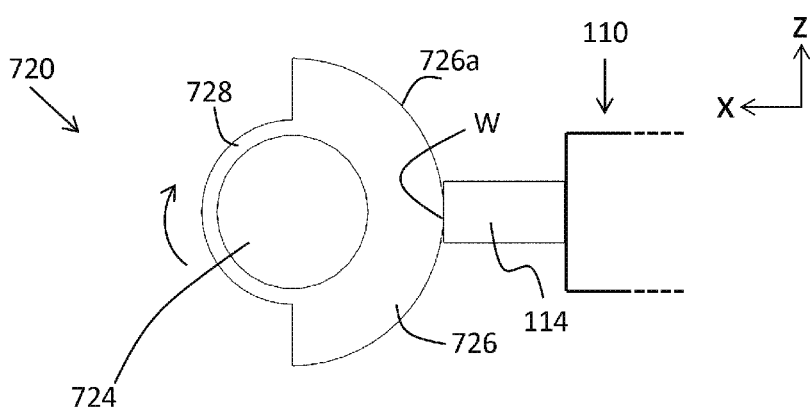
[FIG. 9D]
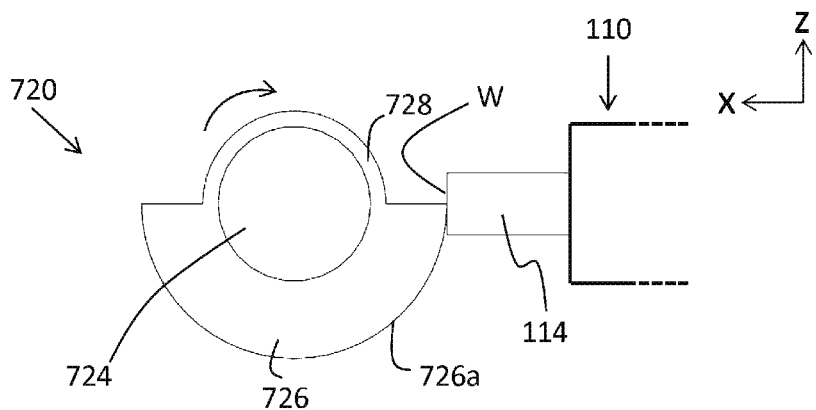

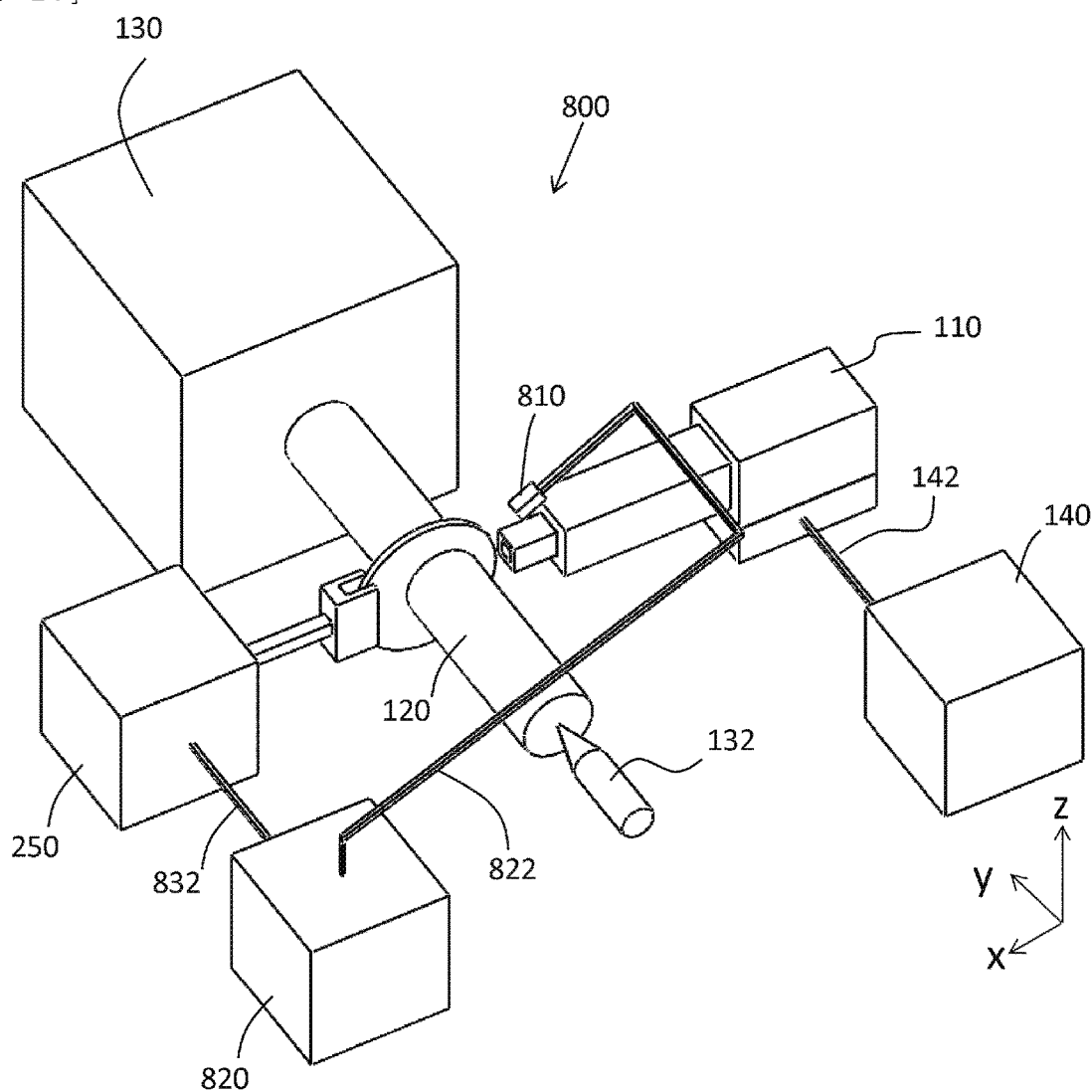
[FIG. 10]

[FIG. 11A]
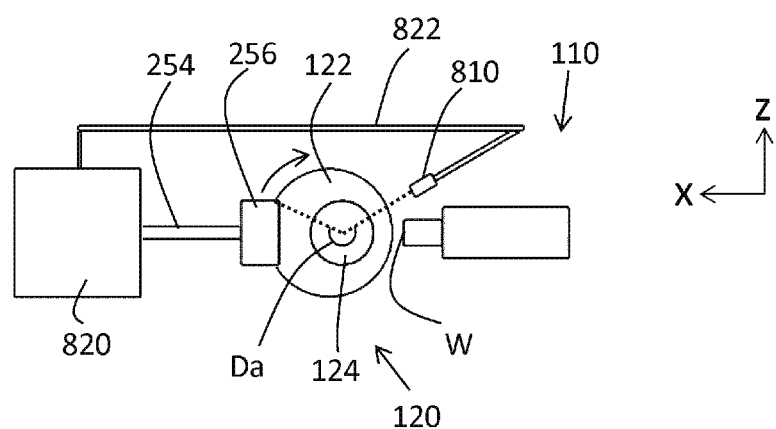
[FIG. 11B]
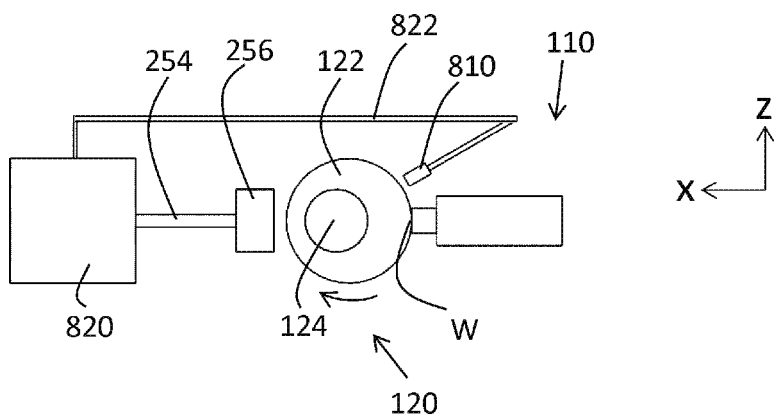

[FIG. 12]
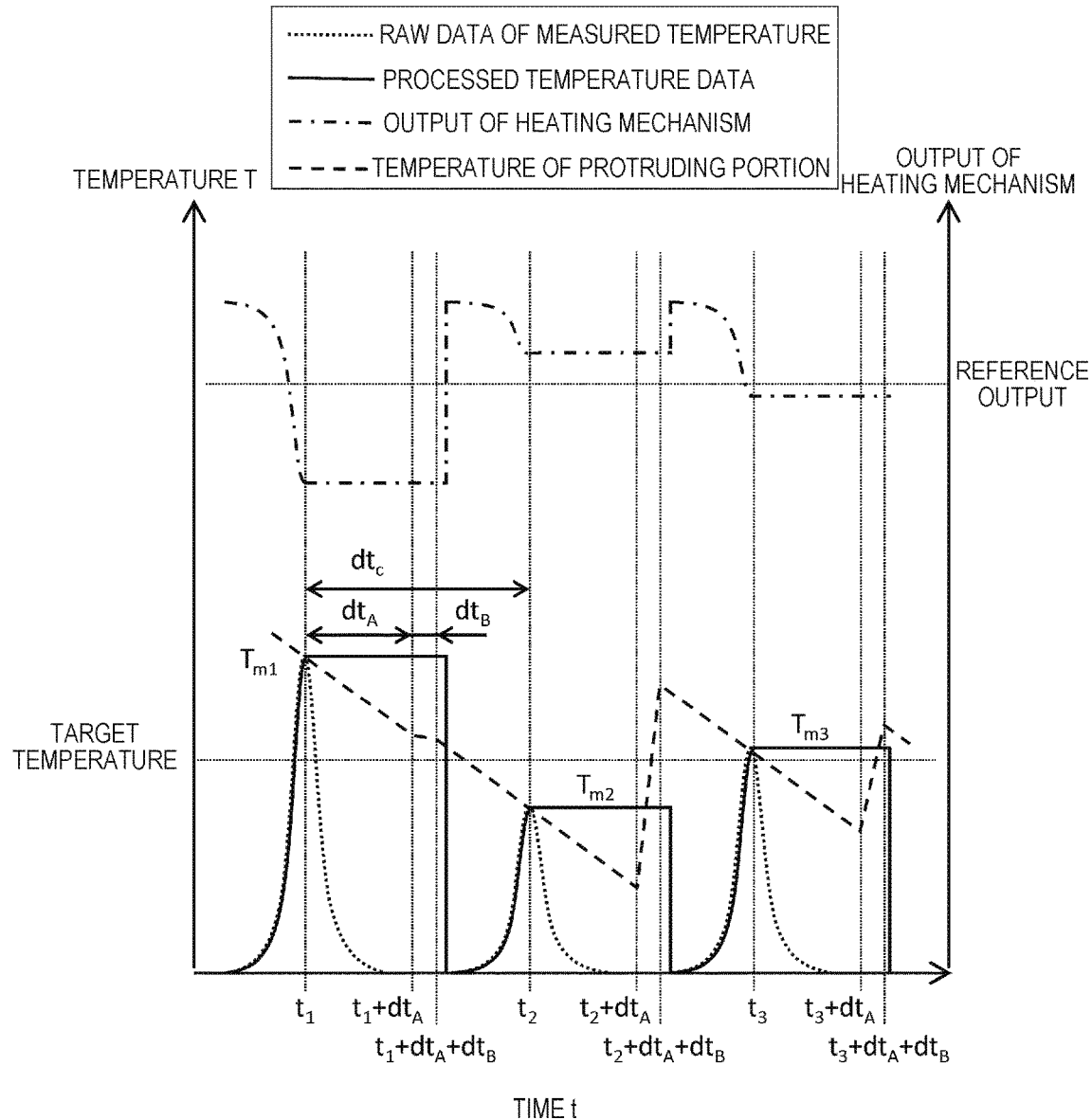

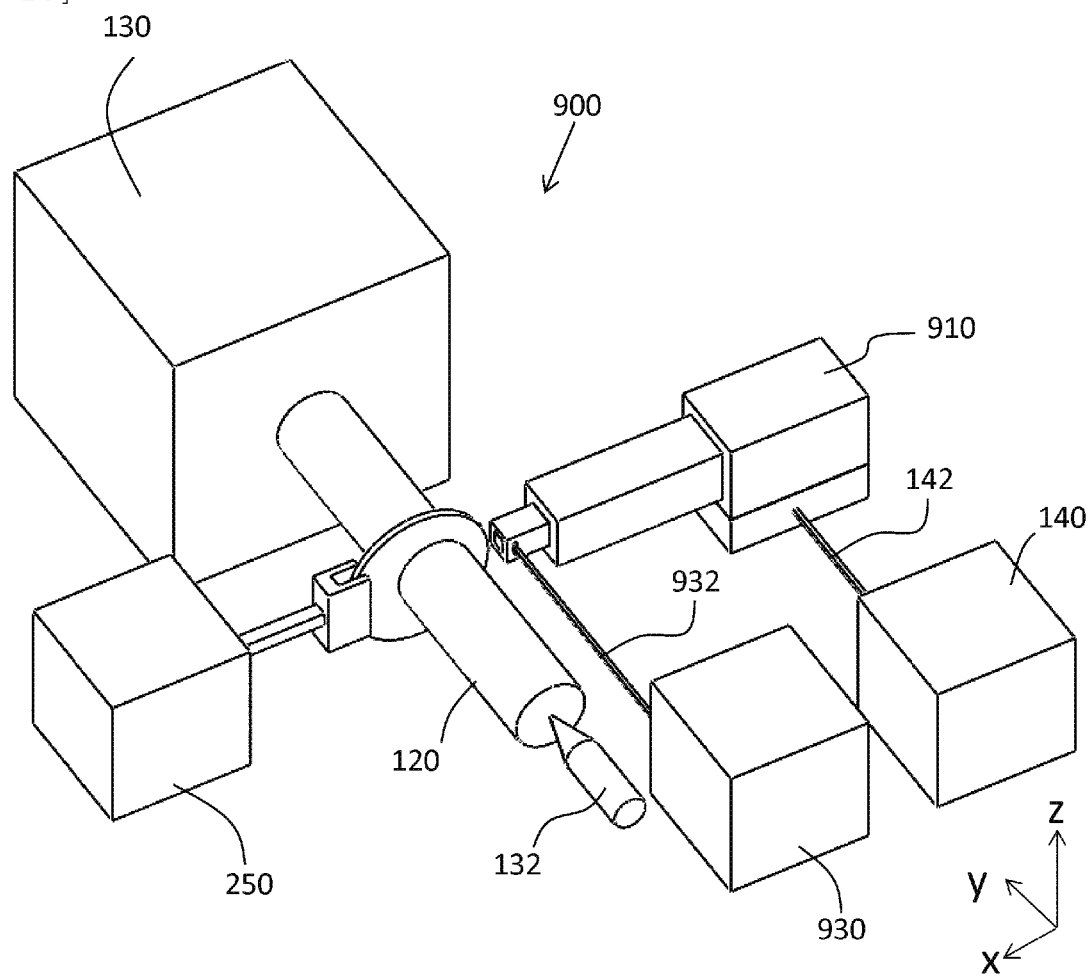
[FIG. 13]

[FIG. 14]
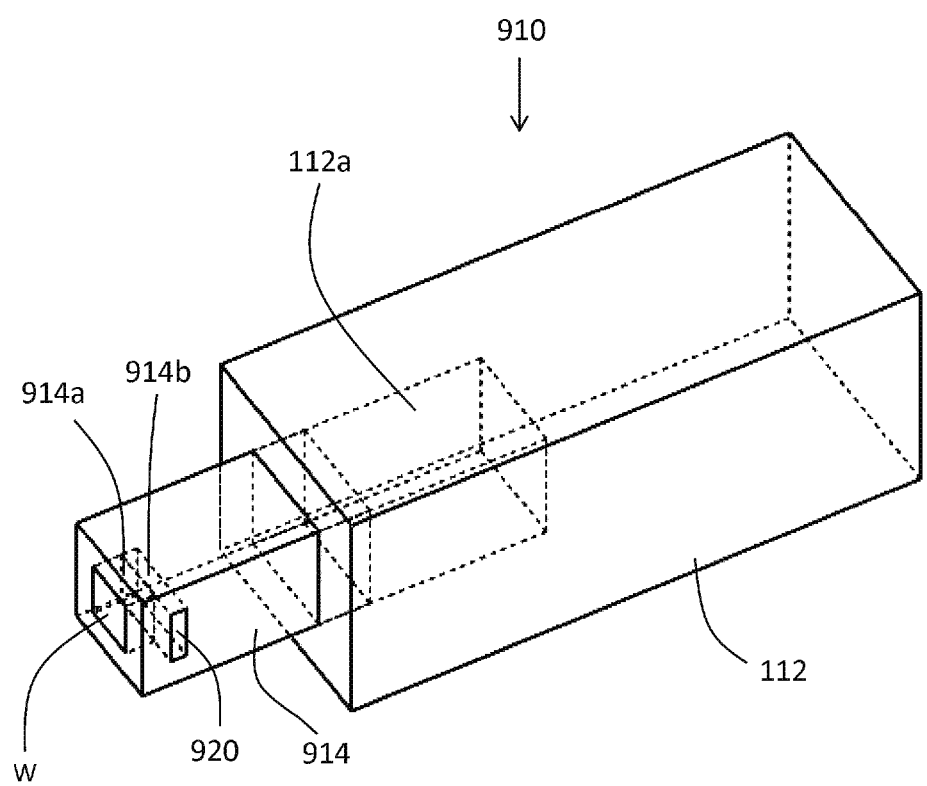

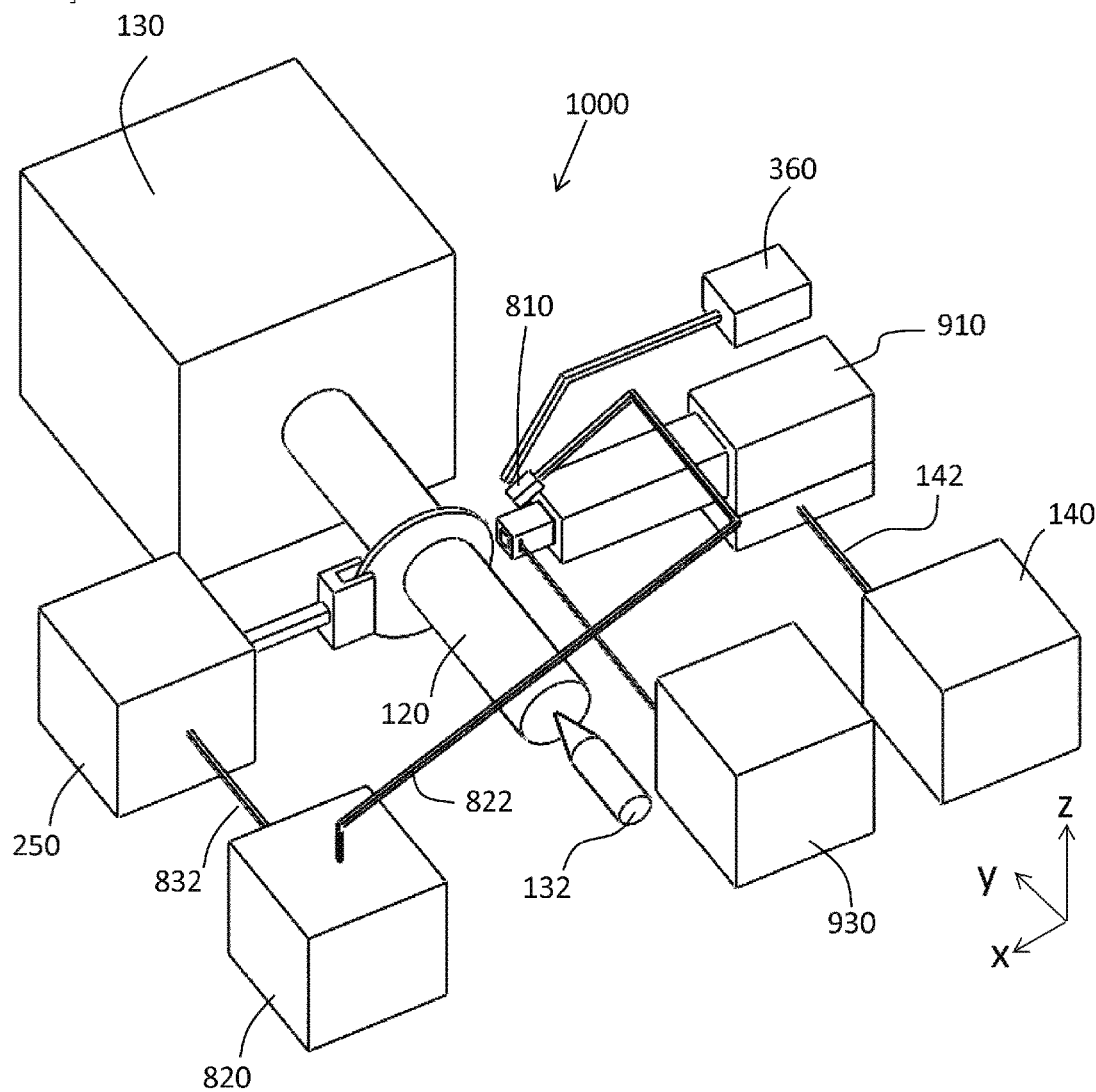
[FIG. 15]

ABRASION TEST APPARATUS

TECHNICAL FIELD

The present invention relates to an abrasion test apparatus, and in particular, to an abrasion test apparatus for measuring an abrasion state due to repeated use of a mold used for molding heated metal.

BACKGROUND ART

In press working or forging processing of a heated metal material, the processing is performed such that a metal material to be processed is sandwiched between molds disposed at an upper part and at a lower part, a large pressurizing force is applied, and accordingly, the metal material is plastically deformed.

In the processing, since the mold directly comes into contact with the metal material, and due to the large pressurizing force, friction occurs repeatedly between the mold and the metal material.

At this time, since the abrasion occurs between the mold and the heated metal material, when the damage of the mold caused by the abrasion is large, cracking or the like of the mold occurs, resulting in a decrease in the life of the mold.

For example, in order to prolong the life of the mold in the forging processing, a method is known that a lubricant is provided between a workpiece and the mold, processing is performed a predetermined number of repeating times with a test apparatus simulating an actual forging processing state, and then evaluation is performed on the lubricant and the mold material (refer to PTL 1).

In addition, a method is known that an abrasion test in which a loading amount of stress during the forging processing is changed by changing the mold shape is performed repeatedly using a test apparatus simulating an actual forging processing state to predict and evaluate the damage due to abrasion or the like of the mold (refer to PTL 2).

CITATION LIST

Patent Literature

PTL 1: JP-A-2009-000694
PTL 2: JP-A-2014-223653
PTL 3: JP-A-2007-513354

SUMMARY OF INVENTION

Technical Problem

Since both the methods described in PTLs 1 and 2 acquire data for evaluation by using the test apparatus simulating the actual forging processing state, it becomes possible to perform the abrasion evaluation on the material and the shape of the workpiece and the mold in simulated forging processing, or on the mold under a forging condition, such as a pressurizing force, a pressurizing speed, and the like.

However, in any of the evaluation methods of PTLs, since the local abrasion state of the mold is evaluated which corresponds to the actual shape of the workpiece, if the specification, such as the material or the shape of the workpiece to be forged is changed, the combination with the material or the shape of the mold for the forging processing becomes enormous. Accordingly, preparing a mold for the test may require a lot of expenses or time for processing the mold, which is problematic.

In addition, in the method described in PTL 1 or 2, it is not possible to evaluate the abrasion form, such as adhesion or seizure, under a high temperature and high pressure environment.

PTL 3 discloses a friction test method using a displaceable rotating body.

However, in neither of the PTLs, there is no suggestion or disclosure regarding a method of enabling a friction test at a predetermined temperature that exceeds a room temperature. Further, if the entire test environment is heated, a large amount of heating energy is required and the entire friction test apparatus is heated to a high temperature, resulting in a new problem that a stable operation of the test apparatus cannot be maintained.

Here, an object of the present invention is to provide an abrasion test apparatus capable of evaluating an abrasion state of heated metal and a mold material with a simple configuration without producing a mold simulating an actual processing state.

Solution to Problem

In order to solve the above-described problems, there is provided an abrasion test apparatus according to the present invention including: a workpiece holding mechanism holding a workpiece; a contact tool repeatedly making contact and non-contact with the workpiece; a rotating mechanism holding the contact tool to be freely rotatable; and a heating mechanism intermittently heating an end portion of the contact tool.

Advantageous Effects of Invention

According to the present invention, it is possible to evaluate the abrasion state of the mold material due to the contact with the heated metal material without producing a mold simulating the actual processing state.

By intermittently heating the end portion of the contact tool, it is possible to heat only the end portion of the contact tool which actually transmits the heat to the workpiece, and a stable operation of the friction test apparatus is realized by reducing the necessary heating energy and lowering the heat transfer amount to the friction test apparatus.

The problems, the configurations, and the effects other than those described above will be clarified from the description of the embodiments below.

BRIEF DESCRIPTION OF DRAWINGS

FIG. 1 is a perspective view illustrating an outline of an abrasion test apparatus according to Example 1 of the present invention.

FIG. 2 is a perspective view illustrating an outline of a workpiece holding mechanism in FIG. 1.

FIG. 3A is a top view illustrating a positional relationship between the workpiece holding mechanism and a contact tool and a heating mechanism in FIG. 1.

FIG. 3B is a side view of FIG. 3A illustrating the positional relationship between the workpiece holding mechanism and the contact tool and the heating mechanism in FIG. 1.

FIG. 3C is a side view illustrating a positional relationship between the workpiece holding mechanism and the contact tool and the heating mechanism in FIG. 1 in a state where the contact tool is in contact with the workpiece.

FIG. 4A is an enlarged view of a main part illustrating a specific movement of the abrasion test apparatus according to Example 1 of the present invention, and illustrates a first stage.

FIG. 4B is an enlarged view of the main part illustrating the specific movement of the abrasion test apparatus according to Example 1 of the present invention, and illustrates a second stage.

FIG. 4C is an enlarged view of the main part illustrating the specific movement of the abrasion test apparatus according to Example 1 of the present invention, and illustrates a third stage.

FIG. 4D is an enlarged view of the main part illustrating the specific movement of the abrasion test apparatus according to Example 1 of the present invention, and illustrates a fourth stage.

FIG. 5A is a perspective view illustrating an outline of an abrasion test apparatus according to Example 2 of the present invention.

FIG. 5B is a view illustrating an outline of the abrasion test apparatus according to Example 2 of the present invention, and is a side view illustrating a positional relationship between a workpiece holding mechanism and a contact tool and a lubricating mechanism in FIG. 5A.

FIG. 6 is a side view of a main part illustrating an outline of a contact tool employed in an abrasion test apparatus according to Example 3 of the present invention.

FIG. 7 is a side view of a main part illustrating an outline of a first modification example of a contact tool employed in the abrasion test apparatus according to Example 3 of the present invention.

FIG. 8 is a side view of a main part illustrating an outline of a second modification example of a contact tool employed in the abrasion test apparatus according to Example 3 of the present invention.

FIG. 9A is a side view of a main part illustrating an outline of a third modification example of a contact tool employed in the abrasion test apparatus according to Example 3 of the present invention, and illustrates a first stage.

FIG. 9B is a side view of the main part illustrating the outline of the third modification example of the contact tool employed in the abrasion test apparatus according to Example 3 of the present invention, and illustrates a second stage.

FIG. 9C is a side view of the main part illustrating the outline of the third modification example of the contact tool employed in the abrasion test apparatus according to Example 3 of the present invention, and illustrates a third stage.

FIG. 9D is a side view of the main part illustrating the outline of the third modification example of the contact tool employed in the abrasion test apparatus according to Example 3 of the present invention, and illustrates a fourth stage.

FIG. 10 is a perspective view illustrating an outline of an abrasion test apparatus according to Example 4 of the present invention.

FIG. 11A is a view illustrating a temperature feedback control mechanism according to Example 4 of the present invention, and is a side view in which a contact tool is in a non-contact state with a workpiece.

FIG. 11B is a view illustrating the temperature feedback control mechanism according to Example 4 of the present invention, and is a side view in which the contact tool is in a contact state with the workpiece.

FIG. 12 is a graph illustrating an outline of a temperature feedback control in the abrasion test apparatus according to Example 4 of the present invention.

FIG. 13 is a perspective view illustrating an outline of an abrasion test apparatus according to Example 5 of the present invention.

FIG. 14 is a perspective view illustrating an outline of a workpiece holding mechanism in FIG. 13.

FIG. 15 is a perspective view illustrating an outline of an abrasion test apparatus according to Example 6 of the present invention.

DESCRIPTION OF EMBODIMENTS

Hereinafter, examples of the present invention will be described with reference to the drawings.

Example 1

FIG. 1 is a perspective view illustrating an outline of an abrasion test apparatus according to Example 1 of the present invention.

As illustrated in FIG. 1, an abrasion test apparatus 100 according to Example 1 of the present invention includes: a workpiece holding mechanism 110 for attaching and holding a workpiece W; a contact tool 120 repeatedly making contact and non-contact with the workpiece W; a rotating mechanism 130 holding the contact tool 120 to be freely rotatable; a data analysis mechanism 140 connected to the workpiece holding mechanism 110 through a connection line 142; and a heating mechanism 250 for heating the contact tool 120 during the test.

The workpiece W which is an object to be measured is attached so as to be exposed on one side of the workpiece holding mechanism. 110, and the contact tool 120 that comes into contact with the workpiece W is disposed at a position facing the workpiece W.

The contact tool 120 is rotatably held by the rotating mechanism 130 including a rotational driving unit (not illustrated) built therein, a rotating force is applied by the rotating driving unit, and accordingly, a contact operation with the workpiece W is performed.

As illustrated in FIG. 1, the rotating mechanism 130 can be directly applied to a rotating mechanism of a machine tool, such as a lathe, for example, and in this case, a core pressing portion 132 that supports one end of the contact tool 120 can be diverted.

FIG. 2 is a perspective view illustrating an outline of a workpiece holding mechanism in FIG. 1.

As illustrated in FIG. 2, the workpiece holding mechanism 110 includes a main body portion 112 and an arm portion 114 provided on a side surface of the main body portion 112.

On one side surface of the main body portion 112, an accommodation hole 112a for accommodating and holding the arm portion 114 freely movably is formed.

The arm portion 114 is a beam-like member having a predetermined length in a longitudinal direction, and a workpiece attachment portion 114a for attaching the workpiece W to one end in the longitudinal direction is formed.

In the example illustrated in FIG. 2, the workpiece W is attached in a form of being embedded in the workpiece attachment portion 114a, and an exposed surface thereof is a contact surface with the contact tool which will be described later.

Here, the workpiece W is formed as a member of a rectangular parallelepiped, but may have a cylindrical shape or a hemispherical shape as long as the workpiece W has a shape that can ensure the contact surface with the contact tool 120.

Further, a sensor (for example, a load cell or the like) capable of directly measuring a load (normal force) in the longitudinal direction of the arm portion 114 with respect to the workpiece W and a frictional force in a direction orthogonal to the normal force, is built in the arm portion 114.

In addition, the data of the normal force and the frictional force detected by the sensor is transferred to the data analysis mechanism 140 through the connection line 142 illustrated in FIG. 1.

On the inside of the accommodation hole 112*a* of the main body portion 112, a resilient portion (not illustrated) that receives a normal force applied to the arm portion 114 in the longitudinal direction is provided.

The resilient portion is formed to have a predetermined length in a no-load state, but when the workpiece W receives the normal force and the arm portion 114 moves in a direction of being pushed into the accommodation hole 112*a*, a reaction force that repels against and pushes back the normal force is generated.

As the resilient portion, for example, a spring body or a pneumatic piston can be exemplified.

In addition, in the Example 1, a case where the arm portion 114 moves forward and rearward with respect to the main body portion 112 is illustrated, but any method may be adopted as long as a mechanism in which the contact surface of the workpiece W attached to one end of the arm portion 114 follows the movement of the contact tool 120 is employed.

For example, the main body portion 112 and the arm portion 114 may be integrally formed, and a sliding mechanism constantly biasing the main body portion 112 in the direction of the contact tool 120 may be provided, or a reciprocating mechanism that interlocks with an approaching and separating operation of the contact tool 120 may be provided.

FIGS. 3A to 3C are views illustrating a positional relationship between the workpiece holding mechanism and the contact tool and the heating mechanism in FIG. 1, FIG. 3A is a top view, FIG. 3B is a side view of FIG. 3A, and FIG. 3C is a side view of the contact tool in a state of being in contact with the workpiece.

As illustrated in FIG. 3A, in the abrasion test apparatus according to Example 1 of the present invention, the contact tool 120 is formed such that a plate-like portion 122 having a circular section in which at least a part of the side surface comes into contact with the workpiece W is nipped, and a shaft portion 124 having a smaller sectional area than that of the plate-like portion 122 is attached in a form of being eccentric to each other.

At this time, a center axis Cd of the plate-like portion 122 is attached so as to be eccentric to a rotation axis Ca of the shaft portion 124.

The plate-like portion 122 is made of a material that can reproduce an abrasion state of the workpiece W by coming into contact with the above-described workpiece W.

For example, in a case where a metal material that configures a mold used in press working or forging processing is selected for the workpiece W, in the plate-like portion 122 of the contact tool 120, a material of the processed material (metal material or the like) is adopted in the press working or the forging processing.

At this time, the plate-like portion 122 and the shaft portion 124 that configure the contact tool 120 may be formed integrally with the same material, or may be formed in a form of joining different materials.

Further, as illustrated in FIG. 3A, a width in a Y direction of the plate-like portion 122 is preferably set to be smaller than a width of a contact surface of the workpiece W attached to the workpiece holding mechanism 110.

The heating mechanism 250 which is the most important feature of the present invention, includes a heated main body portion 252, a heating arm portion 254, and a heating pad portion 256, and the heating pad portion 256 is disposed to face the workpiece holding mechanism 110 nipping the contact tool 120.

In Example 1, the heating pad portion 256 has a heater using, for example, a heating wire, built therein, and adopts a configuration in which energization heating is performed by supplying electric power through the heating arm portion 254 from the heated main body portion 252.

As illustrated in FIGS. 3A and 3B, the heating pad portion 256 is formed as a member including two facing surfaces such that the plate-like portion 122 can pass through the inner region therebetween in accordance with the rotation of the contact tool 120. As such a member including two facing surfaces, in FIGS. 3A to 3C, a shape with a substantially U-shaped section when viewed from above is exemplified.

In addition, in FIGS. 3A to 3C, the heating pad portion 256 having a shape with a substantially U-shaped section is disposed such that an overlapping area (that is, an area where the plate-like portion 122 is heated) in a contact region of the plate-like portion 122 is greater than the overlapping area in a non-contact region.

With such a shape, when the vicinity of the outer circumference of at least the plate-like portion 122 of the rotating contact tool 120 passes through the inside of the two facing surfaces of the heating pad portion 256, in order to be intermittently heated by radiant heat from the two surfaces, it is possible to conduct a test in which the plate-like portion 122 is brought into contact with the workpiece W in a state of being heated from the room temperature.

In other words, the contact tool 120 is formed such that the plate-like portion 122 alternately repeats a heating state and a non-heating state by the rotation. As a result, only a protruding portion of the plate-like portion 122 that comes into contact with the workpiece W can be selectively heated.

According to the concept, the heating mechanism can be simplified compared to a configuration that heats the entire contact tool, and since the heating portion can be localized, the energy required for heating can be reduced, and the friction test can be realized even in an overheating state with power saving. Furthermore, since the amount of heat transferred from the contact tool to the rotating mechanism 130 can be reduced, it is also possible to avoid failures due to the heating to a high temperature of the rotating mechanism 130.

PTL 3 does not suggest or disclose the concept of so-called intermittent heating in which the plate-like portion 122 alternately repeats the heating state and the non-heating state.

At this time, in order to appropriately control the temperature, a configuration for performing a temperature feedback control of the plate-like portion 122 under the test by measuring the temperature of the plate-like portion 122 under the test, by attaching a temperature sensor (not illustrated) to the plate-like portion 122 or using the radiation thermometer (not illustrated), may be employed (for example, refer to Example 4 which will be described later).

As illustrated in FIG. 3B, the abrasion test apparatus 100 according to Example 1 of the present invention is heated by the heating pad portion 256 of the heating mechanism 250 in a non-contact state where the plate-like portion 122 is most separated from the workpiece W.

In addition, as illustrated in FIG. 3C, when the plate-like portion 122 rotates clockwise around the rotation axis Ca of the shaft portion 124 and the outer circumferential surface of the plate-like portion 122 comes into contact with the workpiece W, a state where the normal force and the frictional force are applied to the workpiece W from the heated plate-like portion 122 is achieved.

FIG. 4A to 4D are enlarged views of a main part illustrating a specific movement of the abrasion test apparatus according to Example 1 of the present invention, FIG. 4A illustrates a first stage, FIG. 4B illustrates a second stage, FIG. 4C illustrates a third stage, and FIG. 4D illustrates a fourth stage, respectively.

In the first stage illustrated in FIG. 4A, since the center axis Cd of the plate-like portion 122 is positioned on a side opposite to the workpiece W with reference to the rotation axis Ca of the shaft portion 124, as a result, a positional relationship in which the center axis Cd and the workpiece W are most separated from each other is achieved, and the plate-like portion 122 is in a non-contact state with the workpiece W.

In the second stage illustrated in FIG. 4B, the plate-like portion 122 rotates clockwise around the rotation axis Ca of the shaft portion 124 and the center axis Cd of the plate-like portion 122 is positioned immediately above the rotation axis Ca of the shaft portion 124.

Accordingly, the distance between the plate-like portion 122 and the workpiece W is shortened, and an outer circumferential surface 122a of the plate-like portion 122 comes into contact with the facing surface of the workpiece W.

At this time, a resultant force P of a normal force N in a −X direction in the drawing and a frictional force F in a rotating direction (−Z direction in the drawing) of the plate-like portion 122 is applied from the plate-like portion 122 to the workpiece W.

In the third stage illustrated in FIG. 4C, the plate-like portion 122 further rotates clockwise around the rotation axis Ca of the shaft portion 124 and the center axis Cd of the plate-like portion 122 is positioned on a line that connects the rotation axis Ca of the shaft portion 124 and the workpiece W to each other.

Accordingly, the center axis Cd and the workpiece W are in the closest positional relationship, and the workpiece W is in a state of being pushed the most by the normal force N received from the plate-like portion 122.

In the fourth stage illustrated in FIG. 4D, the plate-like portion 122 further rotates clockwise around the rotation axis Ca of the shaft portion 124 and the center axis Cd of the plate-like portion 122 is positioned immediately below the rotation axis Ca of the shaft portion 124.

Accordingly, the distance between the plate-like portion 122 and the workpiece W changes to be widened compared to the third stage, and as the rotation progresses, the outer circumferential surface 122a of the plate-like portion 122 is separated from the facing surface of the workpiece W, and the stage returns to the first stage illustrated in FIG. 4A.

In this manner, the contact tool 120 held by the rotating mechanism 130 rotates around the rotation axis Ca of the shaft portion 124, and accordingly, the outer circumferential surface 122a of the plate-like portion 122 eccentrically attached to the shaft portion 124 repeatedly makes a contact state and a non-contact state with the workpiece W. In other words, the plate-like portion 122 is in a state where the contact region that comes into contact with the workpiece W and the non-contact region that does not come into contact with the workpiece W are alternately disposed.

At this time, the real-time normal force N and the friction force F in the first to fourth stages illustrated in FIGS. 4A to 4D are measured by the sensor built in the arm portion 114 of the workpiece holding mechanism 110.

In addition, the measured data is sent to the data analysis mechanism 140 through the connection line illustrated in FIG. 1 and stored as time series data.

Further, in addition to the normal force N and the friction force F, for example, by measuring surface displacement of the workpiece W before and after the test with a laser measuring instrument or the like, it is also possible to evaluate a correlation of the abrasion amount of the workpiece W with respect to the number of contacts between the workpiece W and the plate-like portion 122 of the contact tool 120.

With the above-described configuration and operation, since the abrasion test apparatus 100 according to Example 1 of the present invention performs an operation of repeating the contact and non-contact with the workpiece W by rotating the contact tool 120 attached to the rotating mechanism 130, it becomes possible to evaluate the abrasion state due to repeated contact of the workpiece to be measured without particularly preparing a mold or a processed material having a shape that simulates the actual processing state, such as the press working or the forging processing.

In addition, by rotating the contact tool 120 to be brought into contact with the workpiece W, since it is possible to measure not only the normal force N but also the frictional force F with respect to the workpiece W in real time, it also becomes possible to obtain a dynamic friction coefficient of the workpiece W.

Furthermore, since it is possible to conduct the repeated abrasion test with the workpiece W in a state where the plate-like portion 122 of the contact tool 120 is heated to a predetermined temperature, it is possible to evaluate a state where the processed material is heated by the press working or the forging processing, that is, the abrasion state where the processing, such as hot pressing or hot forging, is assumed.

In addition, in the above-described Example 1, a case where a heater that uses a heating wire is built therein as the heating pad portion 256 of the heating mechanism 250 has been exemplified, but as long as a structure capable of at least heating the plate-like portion 122 of the contact tool 120 is employed, a configuration of heating with a burner or a laser, or high-frequency induction heating may be employed.

Example 2

FIGS. 5A and 5B are views illustrating an outline of the abrasion test apparatus according to Example 2 of the present invention, FIG. 5A is a perspective view, and FIG. 5B is a side view illustrating the positional relationship between the workpiece holding mechanism and the contact tool and a lubricating mechanism in FIG. 5A.

In addition, in the abrasion test apparatus according to Example 2, the same reference numerals will be given to the configuration elements having the same structure and operation as those of Example 1, and the description thereof will be omitted here.

As illustrated in FIG. 5A, in addition to the workpiece holding mechanism 110, the contact tool 120, the rotating mechanism 130, the data analysis mechanism 140, and the heating mechanism 250, an abrasion test apparatus 200 according to Example 2 of the present invention includes a lubricating mechanism 360 for supplying a lubricant between the contact tool 120 and the workpiece W under the test.

The lubricating mechanism 360 includes a lubricant supply source 362 for storing the lubricant and a supply pipe 364 for supplying the lubricant to the vicinity of the outer circumferential surface of the contact tool 120.

In addition, at a tip end of the supply pipe 364, as illustrated in FIG. 5B, a nozzle is disposed in the vicinity of the outer circumferential surface 122a of the plate-like portion 122 of the contact tool 120 and on the upstream side of the rotating direction of the contact tool 120.

With such disposition, immediately before coming into contact with the workpiece W held by the workpiece holding mechanism 110, a lubricant L is supplied to the outer circumferential surface 122a of the plate-like portion 122 of the contact tool 120, and the contact state and the non-contact state between the plate-like portion 122 in a state where the lubricant L is held by the outer circumferential surface 122a and the workpiece W are repeated.

With the above-described configuration and operation, in addition to the effect obtained by the abrasion test apparatus according to Example 1, the abrasion test apparatus 200 according to Example 2 of the present invention can conduct the repeated abrasion test with the workpiece W in a state where the lubricant L is interposed in the plate-like portion 122 of the contact tool 120, and accordingly, it is possible to evaluate a state where the lubricant is supplied between the mold and the processed material by the press working or the forging processing, that is, the abrasion state where a case where the dynamic friction coefficient between the mold and the processed material is changed by using the lubricant in combination is assumed.

In addition, in the above-described Example 2, a case where the nozzle is provided at the tip end of the supply pipe 364 and ejects or supplies the lubricant L has been exemplified, but in accordance with the type of the lubricant to be used, a configuration in which, instead of the nozzle, for example, a brush-like coating member is attached and the outer circumferential surface 122a of the plate-like portion 122 is directly coated with the lubricant L may be employed.

Example 3

An outline of the abrasion test apparatus according to Example 3 of the present invention and modification examples thereof will be described with reference to FIGS. 6 to 9.

In addition, in the abrasion test apparatus according to Example 3, the same reference numerals will be given to the configuration elements having the same structure and operation as those of Example 1, and the description thereof will be omitted here.

FIG. 6 is a side view of a main part illustrating an outline of the contact tool employed in the abrasion test apparatus according to Example 3 of the present invention.

As illustrated in FIG. 6, in the abrasion test apparatus according to Example 3, a contact tool 420 is formed such that a plate-like portion 422 having a circular section in which at least a part of a side surface (outer circumferential surface) 422a comes into contact with the workpiece W, and a shaft portion 424 having a smaller sectional area than that of the plate-like portion 422 is attached to each other.

At this time, the center axis Cd that passes through the center of the plate-like portion 422 is attached so as to match the rotation axis Ca of the shaft portion 424.

In the contact tool 420 illustrated in FIG. 6, the plate-like portion 422 has the longest distance from the rotation axis Ca at a position intersecting a long axis of the outer circumferential surface 422a, and has the shortest distance from the rotation axis Ca at a position intersecting a short axis of the outer circumferential surface 422a.

Therefore, when the position of the contact surface of the workpiece W attached to the arm portion 114 of the workpiece holding mechanism 110 is set to be a position which is at a distance of substantially ½ of a long diameter from the rotation axis Ca of the contact tool 420, the workpiece W and the outer circumferential surface 422a of the plate-like portion 422 come into contact with each other only at two positions intersecting the long axis of the plate-like portion 422 and does not come into contact with each other at other positions.

Accordingly, when the contact tool 420 rotates clockwise around the rotational axis Ca, the contact state and the non-contact state between the plate-like portion 422 and the workpiece W are repeated.

FIG. 7 is a side view of a main part illustrating an outline of a first modification example of the contact tool employed in the abrasion test apparatus according to Example 3 of the present invention.

As illustrated in FIG. 7, in the abrasion test apparatus according to the first modification example of Example 3, a contact tool 520 is formed such that a plate-like portion 522 having a rectangular section in which at least a part of a side surface (outer circumferential surface) 522a comes into contact with the workpiece W, and a shaft portion 524 having a smaller sectional area than that of the plate-like portion 522 is attached to each other.

At this time, the center axis Cd that passes through the center of the plate-like portion 522 is attached so as to match the rotation axis Ca of the shaft portion 524.

In the contact tool 520 illustrated in FIG. 7, the plate-like portion 522 has the longest distance from the rotation axis Ca at a position of the outer circumferential surface 522a in the vicinity of the corner portion of four corners, and has the shortest distance from the rotation axis Ca at a center position of four sides of the outer circumferential surface 522a.

Therefore, when the position of the contact surface of the workpiece W attached to the arm portion 114 of the workpiece holding mechanism 110 is set to be a position which is at a distance of substantially ½ of a diagonal line from the rotation axis Ca of the contact tool 520, the workpiece W and the outer circumferential surface 522a of the plate-like portion 522 come into contact with each other only at four positions at four corners of the plate-like portion 522 and does not come into contact with each other at other positions.

Accordingly, when the contact tool 520 rotates clockwise around the rotational axis Ca, the contact state and the non-contact state between the plate-like portion 522 and the workpiece W are repeated.

In the contact tool 520 illustrated in FIG. 7, a case where the plate-like portion 522 having a rectangular section is applied is exemplified, but as long as the structure that can repeatedly change the distance from the rotational shaft Ca in the rotating direction, for example, a plate-like portion having another polygonal shape, such as a triangular shape or a pentagonal section, may be adopted.

Further, when using the plate-like portion 522 having a polygonal section, as illustrated in FIG. 7, an R shape 522b may be processed in the vicinity of the corner portion that comes into contact with the workpiece W of the plate-like portion 522.

The R shape prevents the reaction force received from the workpiece W from being localized and can make smooth contact with the workpiece W in accordance with the rotation of the contact tool 520, and thus, the life of the contact tool 520 can be prolonged.

FIG. 8 is a side view of a main part illustrating an outline of a second modification example of the contact tool employed in the abrasion test apparatus according to Example 3 of the present invention.

As illustrated in FIG. 8, in the abrasion test apparatus according to the second modification example of Example 3, a contact tool 620 is formed such that a plate-like portion 622 including an outer circumference portion substantially having a shape of a gear in which at least a part of a side surface (outer circumferential surface) 622*a* comes into contact with the workpiece W, and a shaft portion 624 having a smaller sectional area than that of the plate-like portion 622 is attached to each other.

At this time, the center axis Cd that passes through the center of the plate-like portion 622 is attached so as to match the rotation axis Ca of the shaft portion 624.

In the contact tool 620 illustrated in FIG. 8, the plate-like portion 622 has a shape in which a recessed portion and a projection portion are alternately formed on the side surface. The plate-like portion 622 has the longest distance from the rotation axis Ca at a position of the "mountain" which is the projection portion of the outer circumferential surface 622*a* substantially having a shape of a gear, and has the shortest distance from the rotation axis Ca at a position of the "valley" which is the recess portion of the outer circumferential surface 622*a*.

Therefore, when the position of the contact surface of the workpiece W attached to the arm portion 114 of the workpiece holding mechanism 110 is set to be a position which is at a distance of substantially the same as a diameter of the "mountain" part substantially having the above-described gear shape from the rotation axis Ca of the contact tool 620, the workpiece W and the outer circumferential surface 622*a* of the plate-like portion 622 come into contact with each other only at the position of the "mountain" of the plate-like portion 622 and does not come into contact with each other at other positions.

Accordingly, when the contact tool 620 rotates clockwise around the rotational axis Ca, the contact state and the non-contact state between the plate-like portion 622 and the workpiece W are repeated.

When using the contact tool 620 illustrated in FIG. 8, an R shape 622*b* may be processed in the vicinity of the "mountain" part that comes into contact with the workpiece W of the plate-like portion 622.

Similar to the first modification example, the R shape prevents the reaction force received from the workpiece W from being localized and can make smooth contact with the workpiece W in accordance with the rotation of the contact tool 620, and thus, the life of the contact tool 620 can be prolonged.

By applying the contact tools 420 to 620 illustrated in FIGS. 6 to 8, in the abrasion test apparatus according to Example 3 of the present invention, the plurality of contact states and the non-contact states with the workpiece W can be generated and repeated while the plate-like portions 422 to 622 of the contact tools 420 to 620 make one rotation clockwise.

In addition, by appropriately changing the shapes of the plate-like portions 422 to 622, it also becomes possible to appropriately adjust the number of contacts in one rotation, the interval time or the like between the contact and the non-contact without changing the rotational speed of the contact tools 420 to 620.

In addition, since there are a plurality of contact portions between the plate-like portions 422 to 622 and the workpiece W, the abrasion of the plate-like portions 422 to 622 becomes equivalent, and as a result, the life of the contact tools 420 to 620 can be prolonged.

FIGS. 9A to 9D are side views of a main part illustrating an outline of a third modification example of a contact tool applied to the abrasion test apparatus according to Example 3 of the present invention, FIG. 9A illustrates a first stage, FIG. 9B illustrates a second stage, FIG. 9C illustrates a third stage, and FIG. 9D illustrates a fourth stage.

As illustrated in FIG. 9A, in the abrasion test apparatus according to the third modification example of Example 3, the contact tool 720 is formed such that a plate-like portion 722 including a large diameter portion 726 in which a part of the side surface (outer circumferential surface) is continuous and comes into contact with the workpiece W and a small diameter portion 728 that does not come into contact with the workpiece W, and a shaft portion 724 having a smaller sectional area than the plate-like portion 722 are attached to each other.

At this time, the center of the large diameter portion 726 or the small diameter portion 728 of the plate-like portion 722 is respectively at the same point, and the center axis Cd that passes through the center thereof is attached to match the rotation axis Ca of the shaft portion 724.

In the contact tool 720 illustrated in FIG. 9A, the large diameter portion 726 in the plate-like portion 722 is a part of an arc positioned to be equidistant from the rotational axis Ca of the shaft portion 724, and the small diameter portion 728 is formed to be a part of the arc positioned to be equidistant from the rotational shaft Ca of the shaft portion 724 having a shorter distance than the large diameter portion 726.

Therefore, when the position of the contact surface of the workpiece W attached to the arm portion 114 of the workpiece holding mechanism 110 is set to be a position which is substantially the same as the outer circumferential surface 726*a* of the large diameter portion 726 of the contact tool 720, the workpiece W and the outer circumferential surface 726*a* of the plate-like portion 722 continuously comes into contact with the region of the large diameter portion 726 and does not come into contact with the region of the small diameter portion 728.

Accordingly, when the contact tool 720 rotates clockwise around the rotational axis Ca, the contact state and the non-contact state between the plate-like portion 722 and the workpiece W are repeated.

Next, the operation of the abrasion test apparatus according to the third modification example of Example 3 will be described.

In the first stage illustrated in FIG. 9A, the large diameter portion 726 of the plate-like portion 722 is positioned on the side opposite to the workpiece W with respect to the rotational shaft Ca of the shaft portion 724, and thus, the plate-like portion 722 is in a state of being in non-contact with the workpiece W.

In the second stage illustrated in FIG. 9B, the plate-like portion 722 rotates clockwise around the rotation axis Ca of the shaft portion 724 and one end of the large diameter portion 726 of the plate-like portion 722 is at a position that comes into contact with the workpiece W.

At this time, similar to the case of FIG. 4, the resultant force P of the normal force N and the friction force F in the rotating direction of the plate-like portion 722 is applied from the plate-like portion 722 to the workpiece W.

In the third stage illustrated in FIG. 9C, the plate-like portion 722 further rotates clockwise around the rotation shaft Ca of the shaft portion 724.

At this time, since the large diameter portion 726 continuously comes into contact with the workpiece W, the resultant force P of the normal force N and the friction force F continuously acts on the workpiece W.

In the fourth stage illustrated in FIG. 9D, the plate-like portion 722 further rotates clockwise around the rotation axis Ca of the shaft portion 724 and the other end of the large diameter portion 726 of the plate-like portion 722 is at a position that comes into contact with the workpiece W.

When the plate-like portion 722 further rotates from the state, the surface facing the workpiece W of the plate-like portion 722 moves to the region of the small diameter portion 728, and thus, the process returns to the first stage illustrated in FIG. 9A.

In this manner, the contact tool 720 according to the third modification example of Example 3 rotates around the rotation axis Ca of the shaft portion 724, and thus, the outer circumferential surface 726a of the large diameter portion 726 of the plate-like portion 722 repeats a state of being continuously in contact with the workpiece W and a state of being in non-contact with the workpiece W as the region of the small diameter portion 728 passes therethrough.

At this time, similar to the case of Example 1, the real-time normal force N and the friction force F in the first to fourth stages are measured by the sensor embedded in the arm portion 114 of the workpiece holding mechanism 110.

By applying the contact tool 720 illustrated in FIGS. 9A to 9D, the abrasion test apparatus according to Example 3 of the present invention can realize a load mode where the constant resultant force P is continuously applied to the workpiece W for a predetermined period, it becomes possible to evaluate the abrasion in a state where the load on the workpiece W is stabilized.

Further, since the contact load is applied to the workpiece W by the continuous large diameter portion 726, the abrasion of the plate-like portion 722 is not concentrated locally, and as a result, the life of the contact tool 720 can be prolonged.

Here, in FIGS. 9A to 9D, a case where the large diameter portion 726 and the small diameter portion 728 are respectively divided into two in the circumferential direction is exemplified, but the large diameter portion 726 at an arbitrary angle, such as a four-divided or eight-divided, may be formed in the circumferential direction.

In addition, although a case where the outer diameter of the large diameter portion 726 is continuously constant has been exemplified, the outer diameter of the large diameter portion 726 may be continuously increased or decreased and the shape that can appropriately adjust the contact load to the workpiece W may be used.

Example 4

FIG. 10 is a perspective view illustrating an outline of an abrasion test apparatus according to Example 4 of the present invention.

In Example 4 illustrated in FIG. 10, as exemplified in the text of Example 1, in order to appropriately control the temperature of the plate-like portion 122, an example in which the temperature of the plate-like portion 122 is feedback controlled by using the radiation thermometer which measures the temperature of the surface in a non-contact state. In addition, in the abrasion test apparatus according to Example 4, the same reference numerals will be given to the configuration elements having the same structure and operation as those of Example 1, and the description thereof will be omitted here.

As illustrated in FIG. 10, an abrasion test apparatus 800 according to Example 4 of the present invention includes: a workpiece holding mechanism 110 for attaching and holding the workpiece W; the contact tool 120 repeatedly making the contact and the non-contact with the workpiece W; the rotating mechanism 130 holding the contact tool 120 to be freely rotatable; the data analysis mechanism 140 connected to the workpiece holding mechanism 110 through the connection line 142; the heating mechanism 250 for heating the contact tool 120 during the test; a radiation thermometer 810 for measuring the temperature of the outer circumferential surface in the plate-like portion 122 of the contact tool 120; and a heating mechanism control unit 820 for controlling the output of the heating mechanism 250 based on the temperature data measured by the radiation thermometer 810. In addition, the heating mechanism control unit 820 is connected to the radiation thermometer 810 through a connection line 822 and is connected to the heating mechanism 250 through a connection line 832.

FIGS. 11A to 11B are views illustrating a temperature feedback control mechanism according to Example 4 of the present invention, FIG. 11A is a side view of a state where the contact tool is in a non-contact state with the workpiece, and FIG. 11B is a side view of a state where the contact tool is in a non-contact state with the workpiece.

As illustrated in FIGS. 11A to 11B, the radiation thermometer 810 measures the temperature in the vicinity of the upstream side of the workpiece W on the outer circumferential surface 122a of the plate-like portion 122 as an example. In other words, the radiation thermometer 810 is disposed to measure the outermost circumferential temperature immediately before the protruding portion of the plate-like portion 122 and the workpiece W come into contact with each other. Conversely, in a case of controlling the outermost circumference temperature immediately after the plate-like portion 122 and the workpiece W come into contact with each other, the radiation thermometer 810 is disposed in the vicinity of the downstream side of the workpiece W on the outer circumferential surface 122a of the plate-like portion 122.

The temperature data at the outermost circumference of the plate-like portion 122 obtained by the radiation thermometer 810 is sent to the heating mechanism control unit 820 through the connection line 822. In addition, from the sent temperature data, the heating mechanism control unit 820 calculates how much the temperature of the plate-like portion 122 is shifted with respect to a preset target temperature and in which manner the output of the heating mechanism 250 is performed in order to set the temperature of the plate-like portion 122 to be the target temperature, and feedback controls the output of the heating mechanism 250.

In this manner, the heating mechanism control unit 820 controls the temperature of the plate-like portion 122 by controlling the output of the heating mechanism 250. For example, in a case where the heater that uses the heating wire is built in the heating pad portion 256, the heating mechanism control unit 820 feedback controls the output of the heating mechanism 250, and accordingly, the temperature of the heater, that is, the temperature of the heating pad portion 256, is controlled. In addition, by controlling the temperature of the heater, the outermost circumferential temperature of the plate-like portion 122 is adjusted to a target temperature.

FIG. 12 is a graph illustrating an outline of a temperature feedback control in the abrasion test apparatus according to Example 4 of the present invention.

Here, in FIG. 12, the horizontal axis represents the time t, the vertical axis represents the temperature T or an output value of the heating mechanism, the dotted line represents raw data of the outermost circumference temperature of the plate-like portion 122 obtained by the radiation thermometer 810, the solid line represents temperature data obtained by performing predetermined processing with respect to the raw data obtained by the radiation thermometer 810, one-dot chain line represents an output of the heating mechanism 250, and the broken line represents the assumed temperature at the protruding portion of the plate-like portion 122.

As illustrated in FIG. 11A, in the abrasion test apparatus 800, the plate-like portion 122 has a disc shape eccentric to the rotation center of the contact tool 120. Accordingly, the distance from the rotation center to the outermost circumference of the plate-like portion 122 differs depending on the rotation angle, and thus, the outermost circumferential portion of the plate-like portion 122 is not uniformly heated by the heating mechanism 250.

Therefore, as illustrated in FIG. 12, the temperature data obtained by the radiation thermometer 810 changes with time. Although depending on the heating method, the shape, and the disposition method of the heating mechanism 250, in a case of the abrasion test apparatus 800 according to Example 4, the protruding portion (the region with the largest eccentric amount from the rotation center) of the plate-like portion 122 is likely to be heated since the distance to the heating mechanism 250 is the closest, and the surface temperature becomes the highest.

In addition, in a case where the contact tool 120 is rotated at a uniform speed by applying, for example, a lathe to the rotating mechanism 130, the radiation thermometer 810 periodically measures the temperature of the protruding portion of the plate-like portion 122.

At this time, as illustrated in FIG. 12, the raw data of the temperature measured by the radiation thermometer 810 takes a maximum value periodically, and a graph in which the maximum value varies for each period is obtained.

In FIG. 12, $t_1$ indicates the time when the radiation thermometer 810 measured the temperature of the protruding portion of the plate-like portion 122, $t_2$ indicates the time when the contact tool 120 rotated one time and the radiation thermometer 810 measured the temperature of the protruding portion of the plate-like portion 122 again, and $t_3$ indicates the time when the contact tool 120 rotated one more time and the radiation thermometer 810 measured the temperature of the protruding portion of the plate-like portion 122 again.

In addition, $dt_A$ indicates the time from measuring the temperature of the protruding portion of the plate-like portion 122 until heating the protruding portion by the heating pad portion 256, $dt_B$ indicates the time while the protruding portion of the plate-like portion 122 is being heated by the heating pad portion 256, and $dt_C$ indicates a time difference between $t_2$ and $t_1$. Here, in a case where the contact tool 120 is rotating at a uniform speed, $dt_C$ is substantially the same as a rotation period $dt_R$ in which the contact tool 120 rotates one time.

As illustrated in FIG. 12, there is a time difference of time $dt_A$ from the time when the radiation thermometer 810 measures the temperature in the protruding portion of the plate-like portion 122 until the protruding portion is heated by the heating pad portion 256. As a result, when it is attempted to perform the temperature feedback control by using the raw data measured by the radiation thermometer 810, since the raw data referred to by the heating mechanism control unit 820 is different from the temperature when the protruding portion of the plate-like portion 122 is actually heated by the heating pad portion 256, the temperature of the protruding portion cannot be accurately controlled.

Here, the temperature of the protruding portion is controlled by using the data obtained by processing the raw data acquired by the radiation thermometer 810 as the temperature data referred to by the heating mechanism control unit 820.

In other words, in the raw data (dotted line) of the measured temperature illustrated in FIG. 12, the temperature data may fluctuate during from the time at which the temperature of the protruding portion is measured by the radiation thermometer 810, for example, $t_1$ to the time $t_1+dt_A+dt_B$ until the heating of the protruding portion by the heating pad portion 256 is finished.

Here, as the temperature data referred to by the heating mechanism control unit 820, a temperature data is used which is obtained by processing the temperature of the raw data measured in the protruding portion during from the time $t_1$ to the time $t_1+dt_A+dt_B$ such that a value of a temperature $T_m$ is kept unchanged at maximum for the time $dt_K$ (that is, for example, a value maintained to be constant at the temperature $T_{m1}$) in a case where the temperature $T_m$ acquired by the radiation thermometer 810 at a certain time t is higher than any temperature T acquired during from the time $t-dt_K$ to the time t (in a case where the temperature $T_m$ continues to rise over time). With this processing, the output of the heating mechanism 250 can be controlled while referring to the temperature of the protruding portion, and the temperature of the protruding portion can be fed back.

It is desirable to perform such data processing every time the contact tool 120 rotates one time because the control accuracy of the temperature in the protruding portion becomes higher. However, when the temperature data measured at the time $t_1$ is maintained for the time $dt_C$ or longer (that is, the rotation period of the contact tool 120), the temperature of the protruding portion at the time $t_2$ cannot be measured, and there is a possibility that the feedback control that refers to the temperature of the protruding portion at $t_2$ is not possible.

Therefore, if the time to maintain the temperature data of the protruding portion of the contact tool 120 is set to $dt_K$, it is supposed to establish a range of $dt_A+dt_B<dt_K<dt_C$. Here, as described above, $dt_C$ is substantially the same as a time (rotation period) $dt_R$ during which the contact tool 120 rotates one time.

In addition, in the above-described description, a case where the feedback control of the temperature by the heating mechanism control unit 820 is performed in relation to the time t has been exemplified, but the feedback control can also be performed using the rotation movement of the contact tool 120. In other words, as illustrated by an angle Da in FIG. 11A, if the angle from the measurement position by the radiation thermometer 810 to the end of the heating of the plate-like portion 122 by the heating pad portion 256 is known, and if the rotation period of the contact tool 120 is defined as $dt_R$, it can be calculated as $dt_A+dt_B=dt_R\times(Da/360)$.

From the above, it is desirable to process the temperature data by setting $dt_K$ in the range of $dt_R \times (Da/360) < dt_K < dt_R$ (Equation (1)).

At this time, Da is not necessarily up to the end position of the heating pad portion 256 as seen in the side view as illustrated in FIG. 11A. For example, a case where the heater that uses the heating wire is not built in the upper end portion of the heating pad unit 256 and a simple case is employed, is assumed. In this case, since the upper end portion of the heating pad 256 does not have the ability to heat the plate-like portion 122, the value of Da decreases accordingly and the range of $dt_K$ becomes wider.

In other words, the angle Da in the description above means a value that considers the range in which the plate-like portion 122 is actually affected by heating. For example, in a case where the heater that uses the heating wire or a high-frequency induction heating coil is built in, the angle Da or the like to a place where there is the heater or the coil is assumed.

Here, the range of the time $dt_K$ for maintaining the temperature data of protruding portion of the contact tool 120 is generalized and defined. Since the angle Da illustrated in FIG. 11A differs depending on the position or the size of the heating pad portion 256, it is difficult to define a lower limit value of the time $dt_K$.

Meanwhile, the upper limit of the time $dt_K$ is a condition for the feedback control of the temperature for each period within the range of the rotation period $dt_R$ or less. Therefore, at least $dt_K$ is desired to be in the range of $dt_K < dt_R$.

In addition, in order to control the temperature of the protruding portion of the plate-like portion 122, at least the temperature referred to may be the temperature of the protruding portion in the feedback control when the protruding portion is heated by the heating pad portion 256. Therefore, the method of processing the temperature data for feedback controlling the temperature of protruding portion is not necessarily limited to the description above.

In addition, as illustrated in Example 1, as heating means applied in the heating pad portion 256, as long as a configuration capable of at least heating the plate-like portion 122 is employed, a configuration of heating with a burner or a laser, or high-frequency induction heating may be employed.

For example, in a case where the burner is applied, a command location of the output from the heating mechanism control unit 820 to the heating mechanism 250 is gas temperature or the like. Meanwhile, for example, in a case where the high-frequency induction heating is applied, the command location for the output to the heating mechanism 250 is the power amount or the like of a power source device in the high-frequency induction heating and the like.

With the above configuration and operation, in addition to the effect obtained by the abrasion test apparatus according to Example 1, the abrasion test apparatus 800 according to Example 4 of the present invention, by controlling the protruding portion of the plate-like portion 122 to a certain temperature, it becomes possible to conduct the friction test in which the temperature of the sliding interface between the plate-like portion 122 and the workpiece W is controlled, and it also becomes possible to obtain reproducibility with respect to the temperature of the friction test.

In addition, in the above-described Example 4, an example in which the plate material 122 having a circular section is used as in Example 1, but, for example, even in a case of a plate material having a different sectional shape as illustrated in Example 3, the temperature control of the protruding portion of the plate material 122 is possible.

In such a case, when heating the protruding portion by the heating pad portion, by processing the temperature data such that the temperature referred to becomes the temperature of the protruding portion to be heated, even when the temperature measurement position by the radiation thermometer and the heating position of the protruding portion by the heating pad portion are shifted, it is possible to control the temperature of the protruding portion to the target temperature.

In addition, the temperature control method of the protruding portion is not limited to the description above. For example, as a data processing method of the temperature data measured by the radiation thermometer, the above-described method should not be limitedly adopted, and at least a method of making the temperature of the protruding portion of the plate-like portion closer to the target temperature compared to a method in which the control is not performed may be employed.

Furthermore, in the above-described Example 4, a case where the heating mechanism control unit 820 performs any of the processing of the raw data of the temperature acquired by the radiation thermometer 810 and the output control of the heating mechanism 250 has been exemplified, but the former operation and the latter operation may be performed by using different mechanisms.

Specifically, instead of the configuration of the heating mechanism control unit 820 illustrated in FIG. 10, a configuration in which a data processing unit for processing the raw data of the temperature acquired by the radiation thermometer 810 and an output control unit for controlling the output of the heating mechanism 250 based on the temperature data processed by the data processing unit are divided, may be employed.

Example 5

FIG. 13 is a perspective view illustrating an outline of the abrasion test apparatus according to Example 5 of the present invention.

In Example 5, an abrasion test apparatus 900 has a function of heating both the plate-like portion 122 of the contact tool 120 and the workpiece W. By heating not only the plate-like portion 122 of the contact tool 120 but also the workpiece W, it becomes possible to hold both the plate-like portion 122 and the workpiece W at a predetermined temperature, and the friction test can be conducted which reproduces the condition that the temperature of both of a material of the mold, such as warm forging or hot forging, and a molding material become a high temperature.

In addition, even in the abrasion test apparatus 900 according to Example 5, the same reference numerals will be given to the configuration elements having the same structure and operation as those of Example 1, and the description thereof will be omitted here.

As illustrated in FIG. 13, the abrasion test apparatus 900 according to Example 5 of the present invention includes: a workpiece holding mechanism 910 for attaching and holding a workpiece W; a workpiece heating driving unit 930 for supplying energy for heating the workpiece W in the workpiece holding mechanism 910; a contact tool 120 repeatedly making contact and non-contact with the workpiece W; a rotating mechanism 130 holding the contact tool 120 to be freely rotatable; a data analysis mechanism 140 connected to the workpiece holding mechanism 910 through a connection line 142; and a heating mechanism 250 for heating the contact tool 120 during the test.

In addition, the workpiece heating driving unit 930 is connected to a heating sheet 920 of the workpiece holding mechanism 910 which will be described later through a supply line 932.

FIG. 14 is a perspective view illustrating an outline of a workpiece holding mechanism in FIG. 13.

As illustrated in FIG. 14, the workpiece holding mechanism 910 includes a main body portion 112 and an arm portion 914 provided on a side surface of the main body portion 112.

The arm portion 914 is a beam-like member having a predetermined length in the longitudinal direction, and a workpiece attachment portion 914a for attaching the workpiece W to the one end in the longitudinal direction is formed, and a heating sheet attachment portion 914b for attaching the heating sheet 920 is formed in the vicinity of the arm portion 914 in the longitudinal direction with respect to the workpiece attachment portion 914a.

The heating sheet 920 is attached to the heating sheet attachment portion 914b of the arm portion 914 by, for example, the heater that uses the heating wire inside, and heats the workpiece W attached to the arm portion 914.

As illustrated in FIG. 13, the heating sheet 920 generates the heat by the energy, such as electric power sent from the workpiece heating driving unit 930 through the supply line 932, and heats the workpiece W by heat transfer through the arm section 914.

The workpiece heating driving unit 930 illustrated in FIG. 13 may be a simple device that sends the energy for heating the heating sheet 920 or may be a mechanism applying the feedback control while monitoring the temperature of the heating sheet 920 to control the temperature of the workpiece W.

Further, in the workpiece W, a mechanism in which a surface temperature on a side that comes into contact with the plate-like portion 122 in the workpiece W is monitored by, for example, a thermocouple or a radiation thermometer (not illustrated), and the workpiece heating driver 930 controls the energy amount sent to the heating sheet 920 through the supply line 932 based on the obtained temperature data, may be employed.

With the above configuration and operation, in addition to the effect obtained by the abrasion test apparatus according to Example 1, the abrasion test apparatus 900 according to Example 5 of the present invention can reduce necessary heating energy by heating the workpiece W, and the stable operation of the friction test apparatus can be realized by lowering the heat transfer amount to the friction test apparatus.

In addition, in the example, an example of heating by the heating sheet in which the heater that uses the heating wire is built is illustrated, but as long as a structure capable of heating only the workpiece W is employed, a configuration, such as a burner, a laser, or high frequency induction heating may be employed.

In addition, in the heating the workpiece W, any of the above-described workpiece heating means may be applied, but in order to obtain reproducibility in the abrasion test between the workpiece W and the plate-like portion 122, a mechanism in which the temperature of the workpiece W can be controlled to a predetermined temperature is preferable.

Furthermore, in order to prevent the heat transfer from the heated workpiece W and the heating sheet 920 to the main body portion 122 through the arm portion 914, a heat insulating material (not illustrated) may be interposed on the workpiece W and the surfaces other than the heat transfer surface of the heating sheet 920.

Example 6

FIG. 15 is a perspective view illustrating an outline of the abrasion test apparatus according to Example 6 of the present invention.

As illustrated in FIG. 15, the abrasion test apparatus according to Example 6 is obtained by integrating the configurations described in the above-described examples as one apparatus. In addition, the same reference numerals will be given to the configuration elements having the same structure and operation as those of Examples 1, 2, 4, and 5, and the description thereof will be omitted here.

In other words, an abrasion test apparatus 1000 according to Example 6 of the present invention includes: the workpiece holding mechanism 910 for attaching and holding the workpiece W; the workpiece heading driving unit 930 for supplying the energy for heating the workpiece W in the workpiece holding mechanism 910; the contact tool 120 repeatedly making the contact and the non-contact with the workpiece W; the rotating mechanism 130 holding the contact tool 120 to be freely rotatable; the data analysis mechanism 140 connected to the workpiece holding mechanism 110 through the connection line 142; the heating mechanism 250 for heating the contact tool 120 during the test; the lubricating mechanism 360 for supplying the lubricant between the contact tool 120 and the workpiece W under the test; the radiation thermometer 810 for measuring the temperature of the outer circumferential surface in the plate-like portion 122 of the contact tool 120; and the heating mechanism control unit 820 for controlling the output of the heating mechanism 250 based on the temperature data measured by the radiation thermometer 810.

In addition, the heating mechanism control unit 820 is connected to the radiation thermometer 810 through a connection line 822 and is connected to the heating mechanism. 250 through a connection line 832.

With the configuration and operation as described above, the abrasion test apparatus 1000 according to Example 6 of the present invention is an aggregation of all the effects obtained by the abrasion test apparatus according to Examples 1 to 5 as one apparatus.

In addition, according to the abrasion test apparatus 1000 according to Example 6, for example, in a state where both the mold material and the molding material are heated to the predetermined temperature, it becomes possible to conduct the abrasion test for simulating the state of the hot forging in which the molding processing is performed while blowing a lubricant or a release agent or the like.

The present invention is not limited to the above-described examples, and includes various modification examples. For example, the above-described examples are examples described in detail in order to make it easy to understand the present invention, and are not limited to a case where all of the described configurations are necessarily provided.

In addition, a part of the configuration of a certain example can be replaced with the configuration of other examples, and the configuration of the other examples can also be added to the configuration of a certain example.

Furthermore, it is also possible to add, remove, or replace other configurations with respect to a part of the configuration of each example.

REFERENCE SIGNS LIST 100, 200, 800, 900, 1000: abrasion test apparatus
110, 910: workpiece holding mechanism 112: main body portion
114, 914: arm portion
120, 420, 520, 620, 720: contact tool
122, 422, 522, 622, 722: plate-like portion
124, 424, 524, 624, 724: shaft portion
130: rotating mechanism
140: data analysis mechanism
250: heating mechanism
252: heating main body portion
254: heating arm portion
256: heating pad portion
360: lubricating mechanism
362: lubricant supply source
364: supply tube
726: large diameter portion
728: small diameter portion
810: radiation thermometer
820: heating mechanism control unit
920: heating sheet
930: workpiece heating driving unit

The invention claimed is:

1. An abrasion test apparatus for measuring an abrasion state of a workpiece, comprising:
a workpiece holding mechanism holding the workpiece;
a contact tool repeatedly making contact and non-contact with the workpiece;
a rotating mechanism holding the contact tool to be freely rotatable; and
a heating mechanism intermittently heating an end portion of the contact tool:
wherein the contact tool includes a plate-like portion in which at least a part of a side surface thereof comes into contact with the workpiece, and a shaft portion which has a smaller sectional area than that of the plate-like portion and is attached to a surface of the plate-like portion,
wherein the plate-like portion includes a contact region coming into contact with the workpiece and a non-contact region not coming into contact with the workpiece to be alternately disposed,
wherein the shaft portion is attached to the rotating mechanism, and
wherein the heating mechanism selectively heats the contact region with the workpiece of the plate-like portion by rotation of the contact tool, and the output of the heating mechanism is controlled at least in part as a function of the rotation of the contact tool;
characterized in that the heating mechanism is formed as a member including two facing surfaces, and the two facing surfaces are disposed such that the plate-like portion of the contact tool is capable of passing through therebetween and an overlapping area of the plate-like portion with the two facing surfaces in the contact region between the plate-like portion and the workpiece is greater than the overlapping area in the non-contact region.

2. The abrasion test apparatus according to claim 1, wherein the plate-like portion has a circular sectional shape, and the contact tool is formed such that a center axis of the plate-like portion and a rotational shaft of the shaft portion are eccentric.

3. The abrasion test apparatus according to claim 1, wherein the plate-like portion has an elliptical sectional shape.

4. The abrasion test apparatus according to claim 1, wherein the plate-like portion has a polygonal sectional shape.

5. The abrasion test apparatus according to claim 4, wherein a tip of a corner portion of the plate-like portion has an R-shape.

6. The abrasion test apparatus according to claim 1, wherein the plate-like portion is formed with a recess portion and a projection portion alternately on the side surface.

7. The abrasion test apparatus according to claim 5, wherein the projection portion is a part of an arc positioned to be equidistant from a rotational shaft of the shaft portion, and the recess portion is a part of an arc positioned to be equidistant from the rotational shaft of the shaft portion having a shorter distance than the projection portion.

8. The abrasion test apparatus according to claim 1, wherein the workpiece holding mechanism includes a main body portion, an arm portion provided on one side surface of the main body portion, and a resilient portion interposed between the main body portion and the arm portion, and a workpiece attachment portion for attaching the workpiece is formed on one end of the arm portion.

9. The abrasion test apparatus according to claim 1, further comprising: a lubricating mechanism supplying a lubricant to a position on an upstream side of the workpiece in a rotating direction of the plate-like portion and in the vicinity of an outer circumferential surface of the plate-like portion.

10. The abrasion test apparatus according to claim 1, further comprising:
a radiation thermometer measuring a temperature at an outermost circumferential surface of the plate-like portion; and
a heating mechanism control unit controlling an output of the heating mechanism based on temperature data obtained from the radiation thermometer.

11. The abrasion test apparatus according to claim 10, wherein
when a rotation period of the rotating mechanism is set to $dt_R$, and an arbitrary time shorter than $dt_R$ is set to $dt_K$, in a case where a temperature $T_m$ acquired by the radiation thermometer at a certain time t is higher than any temperature T acquired during from a time $t-dt_K$ to the time t, the heating mechanism control unit performs processing to make a value of the temperature $T_m$ maximum and unchanged during the time $dt_K$, and controls the output of the heating mechanism based on the processed temperature data.

12. The abrasion test apparatus according to claim 1, further comprising: a workpiece heating mechanism heating the workpiece.

* * * * *